US009478991B2

(12) United States Patent
Weissentern et al.

(10) Patent No.: US 9,478,991 B2
(45) Date of Patent: Oct. 25, 2016

(54) SYSTEM AND METHOD FOR TRANSFERRING POWER INDUCTIVELY OVER AN EXTENDED REGION

(71) Applicant: POWERMAT TECHNOLOGIES LTD., Neve Ilan (IL)

(72) Inventors: Eran Weissentern, Jerusalem (IL); Arik Rofe, Jerusalem (IL); Amir Ben-Shalom, Modiin (IL); Guy Raveh, Mataa (IL); Elieser Mach, Tzurim (IL); Oola Greenwald, Mevasseret Zion (IL)

(73) Assignee: POWERMAT TECHNOLOGIES LTD., Neve Ilan (IL)

( * ) Notice: Subject to any disclaimer, the term of this patent is extended or adjusted under 35 U.S.C. 154(b) by 981 days.

(21) Appl. No.: 13/663,749

(22) Filed: Oct. 30, 2012

(65) Prior Publication Data

US 2013/0049484 A1 Feb. 28, 2013

Related U.S. Application Data

(63) Continuation of application No. PCT/IL2011/000341, filed on Apr. 28, 2011.

(60) Provisional application No. 61/329,809, filed on Apr. 30, 2010, provisional application No. 61/391,291, filed on Oct. 8, 2010, provisional application No. 61/431,122, filed on Jan. 10, 2011.

(51) Int. Cl.
*H01F 38/14* (2006.01)
*H02J 5/00* (2016.01)

(52) U.S. Cl.
CPC ............... *H02J 5/005* (2013.01); *H01F 38/14* (2013.01)

(58) Field of Classification Search
CPC .................................. H02J 5/005; H01F 38/14
USPC .......................................................... 30/104
See application file for complete search history.

(56) References Cited

U.S. PATENT DOCUMENTS 9,125,242 B2 * 9/2015 Budgett ................. A61M 1/127
2005/0189910 A1 9/2005 Hui
(Continued)

FOREIGN PATENT DOCUMENTS

JP 04-156242 5/1992
JP 07-039078 2/1995
(Continued)

OTHER PUBLICATIONS

International Search Report dated Mar. 16, 2012 for PCT/IL2011/000341 Filed Apr. 28, 2011.
(Continued)

*Primary Examiner* — Jared Fureman
*Assistant Examiner* — Emmanuel R Dominique
(74) *Attorney, Agent, or Firm* — William Dippert; Laurence Greenberg; Werner Stemer

(57) ABSTRACT

An inductive power transfer system operable in a plurality of modes comprising an inductive power transmitter capable of providing power to the inductive power receiver over an extended region. The system may be switchable between the various modes by means of a mode selector operable to activate various features as required, such as: an alignment mechanism a resonance tuner, an auxiliary coil arrangement or a resonance seeking arrangement. Associated methods are taught.

9 Claims, 26 Drawing Sheets

(56) References Cited

U.S. PATENT DOCUMENTS

| | | | |
|---|---|---|---|
| 2006/0071632 A1* | 4/2006 | Ghabra | G01V 3/101 320/108 |
| 2007/0103110 A1 | 5/2007 | Sagoo | |
| 2007/0109708 A1* | 5/2007 | Hussman | H02J 1/00 361/113 |
| 2007/0182367 A1* | 8/2007 | Partovi | H01F 5/003 320/108 |
| 2009/0174263 A1* | 7/2009 | Baarman | H02J 5/005 307/104 |
| 2009/0174364 A1* | 7/2009 | Onishi | H02J 7/025 320/108 |
| 2009/0243397 A1* | 10/2009 | Cook | H02J 5/005 307/104 |
| 2010/0036773 A1* | 2/2010 | Bennett | G06Q 20/3674 705/67 |
| 2010/0084918 A1* | 4/2010 | Fells | H02J 5/005 307/32 |
| 2010/0201204 A1* | 8/2010 | Sakoda | H02J 5/005 307/104 |
| 2010/0244580 A1* | 9/2010 | Uchida | H02J 5/005 307/104 |
| 2010/0277120 A1* | 11/2010 | Cook | H01Q 19/005 320/108 |
| 2010/0308665 A1 | 12/2010 | Itkonen | |
| 2011/0057607 A1* | 3/2011 | Carobolante | H02J 7/025 320/108 |
| 2011/0156640 A1* | 6/2011 | Moshfeghi | H02J 7/025 320/108 |
| 2012/0032632 A1* | 2/2012 | Soar | H01F 38/14 320/108 |
| 2012/0112531 A1* | 5/2012 | Kesler | B60L 11/182 307/9.1 |
| 2012/0112532 A1* | 5/2012 | Kesler | H03H 7/40 307/9.1 |
| 2012/0235502 A1* | 9/2012 | Kesler | H03H 7/40 307/104 |

FOREIGN PATENT DOCUMENTS

| | | | |
|---|---|---|---|
| JP | 07-036556 | | 7/1995 |
| JP | 2001-309579 | | 11/2001 |
| JP | 2001309579 | | 11/2001 |
| JP | 2005-006440 | | 1/2005 |
| JP | 2005-110412 | | 4/2005 |
| JP | 2006-102055 | | 4/2006 |
| JP | 2007-529110 | | 10/2007 |
| NZ | WO2009/091267 | * | 7/2009 |
| WO | 2005041281 A1 | | 5/2005 |
| WO | WO2008/038203 A2 | | 4/2008 |
| WO | 2009/037380 A1 | | 3/2009 |

OTHER PUBLICATIONS

Office Action dated Mar. 22, 2013, for Mexican Application MX/a/2011/003088.

Office Action dated Feb. 5, 2013, for Chinese Application 201110068458.7.

Office Action dated May 28, 2013, for Japanese Application 2010-526422.

Office Action dated May 28, 2013, for Japanese Application 2010-528526.

Office Action dated May 21, 2013, for Japanese Application 2011-500345.

* cited by examiner

SYSTEM AND METHOD FOR TRANSFERRING POWER INDUCTIVELY OVER AN EXTENDED REGION

CROSS-REFERENCE TO RELATED APPLICATIONS

This application is the U.S. national phase of PCT Appln. No. PCT/IL2011/000341 filed Apr. 28, 2011 which claims the benefit of U.S. provisional application Ser. No. 61/329,809 filed Apr. 30, 2010, U.S. provisional application Ser. No. 61/391,291 filed Oct. 8, 2010, and U.S. provisional application 61/431,122 filed Jan. 10, 2011, the disclosures of which are incorporated in their entirety by reference herein.

TECHNICAL FIELD

The embodiments disclosed herein relate to inductive power transfer systems. In particular the embodiments relate to inductive power transfer systems operable to transfer power over extended regions.

BACKGROUND

Inductive power coupling, as known in the art, allows energy to be transferred from a power supply to an electric load without connecting wires. A power supply is wired to a primary coil and an oscillating electric potential is applied across the primary coil, thereby inducing an oscillating magnetic field. The oscillating magnetic field may induce an oscillating electrical current in a secondary coil placed close to the primary coil. In this way, electrical energy may be transmitted from the primary coil to the secondary coil by electromagnetic induction without the two coils being conductively connected. When electrical energy is transferred from a primary coil to a secondary coil the coil pair are said to be inductively coupled. An electric load wired in series with such a secondary coil may draw energy from the power source wired to the primary coil when the secondary coil is inductively coupled thereto.

Induction type power outlets may be preferred to the more common conductive power sockets because they provide seamless power transmission and minimize the need for trailing wires.

The range of the inductive transmission as well as the strength of the induced voltage in the secondary inductor both vary according to the oscillating frequency of the electrical potential provided to the primary inductor. The induced voltage is strongest when the oscillating frequency equals the resonant frequency of the system. The resonant frequency $f_R$ depends upon the inductance L and the capacitance C of the system according to the equation:

$$f_R = \frac{1}{2\pi\sqrt{LC}}.$$

Efficiency of energy transfer depends upon a number of parameters including the resonant frequency of the system, the transmission frequency of operation as well as the distance and alignment between the primary and secondary inductive coils. There is a need for an inductive power transmission system which is able to adapt to changing conditions and to transmit power at a wide range of intercoil distances. The embodiments described herein address this need.

SUMMARY OF THE EMBODIMENTS

The embodiments described herein disclose an inductive power transfer system operable in a plurality of modes comprising at least one of: an inductive power transmitter, and an inductive power receiver. The plurality of modes may enable the inductive power transmitter to provide power to the inductive power receiver over an extended region.

The inductive power transmitter may comprise at least one primary inductor configured to couple inductively with at least one secondary inductor and at least one driver configured to provide an oscillating electric potential at a driving frequency across the primary inductor. The inductive power receiver may comprise at least one secondary inductor connectable to a receiving circuit and an electric load, the secondary inductor configured to couple inductively with the at least one primary inductor such that power is transferred to the electric load.

According to various embodiments, the inductive power transfer system may further comprise, amongst other elements, a plurality of features selected from: an alignment mechanism configured to align the at least one secondary inductor to the at least one primary inductor when the inductive power transfer system is operating in a first mode; a resonance tuner operable to match the driving frequency to a resonant frequency of the reception circuit when the inductive power transfer system is operating in a second mode; an auxiliary coil arrangement comprising a plurality of auxiliary coils operable in at least one of: conductor mode, repeater mode and transmission mode; and a resonance seeking arrangement operable to determine the natural frequencies of the inductive power transfer system.

Optionally, the inductive power transfer system further comprises a mode selector configured to switch the inductive power transfer system between at least a first mode and a second mode.

Optionally, the inductive power transfer system further comprises a proximity sensor for monitoring the distance from the secondary inductor to the primary inductor.

Optionally, the inductive power transfer system further comprises a position sensor for monitoring the position of at least one of the primary inductor and the secondary inductor.

Optionally, the resonance tuner comprises at least one capacitor selectively connectable to the receiving circuit.

Optionally, the resonance tuner comprises at least one inductor selectively connectable to the receiving circuit.

Optionally, the resonance tuner comprises a feedback mechanism configured to send control signals to the inductive power transmitter such that the inductive power transmitter selects a driving frequency resonant with the receiving circuit.

Optionally, the alignment mechanism comprises at least one magnetic flux guide configured to direct magnetic flux from the primary inductor to the secondary inductor.

Optionally, the magnetic flux guide comprises a first ferrite core associated with the primary inductor and a second ferrite core associated with the secondary inductor.

Optionally, the magnetic flux guide further comprises magnetic shielding.

Optionally, the alignment mechanism comprises at least one actuator configured to move at least one of the secondary inductor and the primary inductor.

Optionally, the auxiliary coil arrangement comprises: at least one auxiliary coil; at least one controller configured to select an operational mode for the auxiliary coil; and at least one switching unit operable to selectively connect the auxiliary coil to at least one of a conductive mode block, a repeater mode block and a transmission mode block.

The inductive power transmitter described herein may be operable in at least two modes. The transmitter may comprise: at least one primary inductor configured to couple inductively with a secondary inductor connected to an electric load such that power is transferred to the electric load; at least one driver configured to provide an oscillating electric potential across the primary inductor; at least one alignment mechanism configured to align the secondary inductor to the primary inductor when the inductive power transmitter is operating in a first mode; and at least one resonance tuner configured to select a driving frequency for the oscillating electrical potential selected to match a resonant frequency of a reception circuit associated with the secondary inductor when the inductive power transmitter is operating in a second mode.

Optionally, the inductive power transmitter further comprises a mode selector configured to switch the inductive power transmitter between the first mode and the second mode.

Optionally, the driver is configured to drive the primary inductor at a non-resonant frequency when operating in the first mode.

Electrical device are disclosed herein comprising such an inductive power transmitter.

An inductive power receiver is disclosed herein which is operable in at least two modes. The receiver may comprise: at least one secondary inductor connectable to an electric load and configured to couple inductively with at least one primary inductor of at least one inductive power transmitter such that power is transferred to the electric load; at least one alignment mechanism configured to align the secondary inductor to a primary inductor when the inductive power receiver is operating in a first mode; and at least one resonance tuner configured to tune a receiving circuit to a resonant frequency selected to match a transmission frequency of a remote primary inductor when the inductive power receiver is operating in a second mode.

Optionally, the inductive power receiver further comprises a mode selector configured to switch the inductive power receiver between the first mode and the second mode.

Optionally, the mode selector is configured to select an operating mode according to data pertaining to the location of the primary inductor.

Optionally, the inductive power receiver further comprises a proximity sensor for monitoring the distance from the secondary inductor to the primary inductor.

Optionally, the inductive power receiver further comprises a position sensor for monitoring the position of the primary inductor.

Optionally, the resonance tuner comprises at least one capacitor selectively connectable to the receiving circuit.

Optionally, the resonance tuner comprises at least one inductor selectively connectable to the receiving circuit.

Optionally, the resonance tuner comprises a feedback mechanism configured to send control signals to the inductive power transmitter such that the inductive power transmitter selects a driving frequency resonant with the receiving circuit.

Optionally, the alignment mechanism comprises at least one magnetic flux guide configured to direct magnetic flux from the primary inductor to the secondary inductor.

Optionally, the alignment mechanism comprises at least one actuator configured to move at least one of the secondary inductor and the primary inductor.

An electrical device is disclosed comprising the inductive power receiver of.

Additionally, a method is taught for transferring power inductively from to at least one electrical load comprising: obtaining an inductive power transmitter comprising a driver and a primary coil; obtaining an inductive power receiver comprising a secondary coil connected to the electrical load, the inductive power receiver operable in at least two modes, including a first mode providing tight coupling between the primary inductor and the secondary inductor, and a second mode providing loose coupling between the primary inductor and the secondary inductor; the driver providing an oscillating potential difference across the primary inductor; selecting operating mode for the inductive receiver.

It is an aspect of the invention described herein to teach a method for calibrating an inductive power transfer system comprising at least one inductive power transmitter coupled to at least one inductive power receiver. The method comprises the steps of determining a resonant frequency of the system and selecting an operation frequency different from the resonant frequency.

According to various embodiments, the step of determining a resonant frequency of the system comprises the substeps of supplying a driving potential to the inductive power transmitter oscillating at a sampling driving frequency; recording output response for the driving potential; incrementing the sampling driving frequency; repeating these substeps a plurality of times; and recording the output voltage response for a plurality of discrete sampling driving frequencies thereby obtaining a characteristic response profile for the system.

Typically, the characteristic response profile includes a resonant peak and a plurality of harmonic peaks. Accordingly the step of determining a resonant frequency of the system may comprise the additional substep of: identifying the driving frequency of the resonant peak. Alternatively, the step of determining a resonant frequency of the system comprises the additional substeps of identifying the driving frequency of the nth order harmonic peak; and dividing the driving frequency of the nth order harmonic by n+1. It is noted that variously, n=2, n=3 or so on.

Optionally, the step of selecting an operating frequency different from the resonant frequency comprises selecting a frequency equal to the resonant frequency multiplied by a scaling factor. The scaling factor may be selected between 50% and 90%. Alternatively, the scaling factor may be selected between 110% and 150%.

According to another aspect of the invention, an inductive power transfer system is disclosed comprising at least one inductive power outlet comprising at least one primary inductive coil wired to a power supply via a driver, the driver being configured to provide a driving voltage across the primary inductive coil, the driving voltage oscillating at a transmission frequency significantly different from the resonant frequency of the inductive couple, the primary inductive coil configured to forming an inductive couple with at least one secondary inductive coil wired to an electric load, the secondary inductive coil associated with an inductive power receiver; wherein the inductive power transfer system is configured to self-determine the resonant frequency of the inductive couple.

An alignment system is disclosed herein, which is configured and operable to align a primary inductor of an inductive power transmitter to a secondary inductor situated within a target region. The system may comprise a first actuator configured to move the primary inductor along a first path; and a second actuator configured to move the secondary inductor along a second path. Furthermore, an inductive power transmission system comprising such an alignment system is thereby introduced.

Optionally, at least one of the first actuator and the second actuator comprises a stepper motor. Alternatively, or additionally, at least one of the first actuator and the second actuator comprises a piezoelectric element.

The primary inductor may be coupled to the first actuator and the first actuator is coupled to the second actuator. Alternatively, the primary inductor may be directly coupled to the first actuator and the second actuator. Where appropriate, the first path and the second path are orthogonally orientated. Optionally, the first actuator and the second actuator are situated in proximity to each other.

In selected systems, at least one of the first actuator and the second actuator is configured to step along an associated path in increments. These increments may be selectable from low resolution increments and high resolution increments.

Particular systems further comprise a proximity sensor configured to indicate proximity of the primary inductor to the secondary inductor. Such a proximity sensor may comprise at least one of a group consisting of voltage monitor, power monitor, current monitor and combinations thereof.

Optionally, the system may further comprise a controller configured to receive sensing signals from the proximity sensor and to control movement of the first actuator and the second actuator. Such a controller may comprise a processor operable to direct movement of the first actuator and the second actuator such that the primary inductor is moved into alignment with the secondary inductor.

Variously the processor may be configured to select actuation signals to be sent to the actuators according to the following steps: (step a) a sensing signal is received from the proximity sensor; (step b) an actuation signal is sent to the first actuator thereby moving the primary inductor forwards by one increment along the first path; (step c) a new sensing signal is received from the proximity sensor; (step d1) if the new sensing signal indicates that the primary inductor is closer to the secondary inductor than a previous signal then step b and step c are repeated; (step d2) if the new sensing signal indicates that the primary inductor is further from the secondary inductor than a previous signal then a reverse actuation signal is sent to the first actuator thereby moving the primary inductor backwards by one increment along the first path; (step e) an actuation signal is sent to the second actuator thereby moving the primary inductor forwards by one increment along the second path; (step f) a new sensing signal is received from the proximity sensor; (step g1) if the new sensing signal indicates that the primary inductor is closer to the secondary inductor than a previous signal then step e and step f are repeated; and (step g2) if the new sensing signal indicates that the primary inductor is further from the secondary inductor than a previous signal then a reverse actuation signal is sent to the second actuator thereby moving the primary inductor backwards by one increment along the secondary path.

Where the controller is configured to send low resolution actuation signals configured to move the primary inductor by larger increments and high resolution actuation signals configured to move the primary inductor by smaller increments, the processor may be further configured to follow the additional steps: (step h) a high resolution actuation signal is sent to the first actuator thereby moving the primary inductor forwards by one small increment along the first path; (step i) a new sensing signal is received from the proximity sensor; (step j1) if the new sensing signal indicates that the primary inductor is closer to the secondary inductor than a previous signal then step h and step i are repeated; (step j2) if the new sensing signal indicates that the primary inductor is further from the secondary inductor than a previous signal then a reverse high actuation signal is sent to the first actuator thereby moving the primary inductor backwards by one small increment along the first path; (step k) a high resolution actuation signal is sent to the second actuator thereby moving the primary inductor forwards by one small increment along the second path; (step l) a new sensing signal is received from the proximity sensor; (step m1) if the new sensing signal indicates that the primary inductor is closer to the secondary inductor than a previous signal then step k and step l are repeated; and (step m2) if the new sensing signal indicates that the primary inductor is further from the secondary inductor than a previous signal then a reverse high resolution actuation signal is sent to the second actuator thereby moving the primary inductor backwards by one small increment along the secondary path.

Accordingly, a method is taught for aligning a primary inductor of an inductive power transmission system to a secondary inductor situated within a target region. The method comprises providing a first actuator configured to move the primary inductor along a first path; providing a second actuator configured to move the secondary inductor along a second path; providing a proximity sensor configured to indicate proximity of the primary inductor to the secondary inductor; providing a controller configured to receive sensing signals from the proximity sensor and to control movement of the first actuator and the second actuator; and the controller sending actuation signals to at least one of the first actuator and the second actuator such that the primary inductor is moved into alignment with the secondary inductor.

Optionally, the step of the controller sending actuation signals comprises: the controller receiving a sensing signal from the proximity sensor; the controller sending an actuation signal to the first actuator thereby moving the primary inductor forwards by one increment along the first path; the controller receiving a new sensing signal is received from the proximity sensor; if the new sensing signal indicates that the primary inductor is closer to the secondary inductor than a previous signal then repeating the steps of the controller sending an actuation signal and receiving a new sensing signal; if the new sensing signal indicates that the primary inductor is further from the secondary inductor than a previous signal then sending a reverse actuation signal to the first actuator thereby moving the primary inductor backwards by one increment along the first path; the controller sending an actuation signal to the second actuator thereby moving the primary inductor forwards by one increment along the second path; the controller receiving a new sensing signal from the proximity sensor; if the new sensing signal indicates that the primary inductor is closer to the secondary inductor than a previous signal then the steps of the controller sending an actuation signal and receiving a new sensing signal; and if the new sensing signal indicates that the primary inductor is further from the secondary inductor than a previous signal then sending a reverse actuation signal to the second actuator thereby moving the primary inductor backwards by one increment along the secondary path.

Where appropriate, the method may further comprise the steps of: the controller sending a high resolution actuation signal to the first actuator thereby moving the primary inductor forwards by one small increment along the first path; the controller receiving a new sensing signal is received from the proximity sensor; if the new sensing signal indicates that the primary inductor is closer to the secondary inductor than a previous signal then repeating the steps of the controller sending a high resolution actuation signal and receiving a new sensing signal; if the new sensing signal indicates that the primary inductor is further from the secondary inductor than a previous signal then sending a reverse high resolution actuation signal to the first actuator thereby moving the primary inductor backwards by one small increment along the first path; the controller sending a high resolution actuation signal to the second actuator thereby moving the primary inductor forwards by one small increment along the second path; the controller receiving a new sensing signal from the proximity sensor; if the new sensing signal indicates that the primary inductor is closer to the secondary inductor than a previous signal then repeating the steps of the controller sending an actuation signal and receiving a new sensing signal; and if the new sensing signal indicates that the primary inductor is further from the secondary inductor than a previous signal then sending a reverse high resolution actuation signal to the second actuator thereby moving the primary inductor backwards by one small increment along the secondary path.

Embodiments of an inductive power receiver are presented herein having a reception circuit configured to inductively couple with an inductive power transmitter to form an inductive transfer system, the reception circuit comprising at least one secondary inductor configured to inductively couple with a primary inductor associated with the inductive power transmitter, and a regulator, configured to regulate an output voltage of the reception circuit, wherein the regulator comprises: at least one resonance-altering component, and at least one switching unit configured to selectively connect the resonance-altering component to the reception circuit.

Optionally, the inductive transfer system has a first resonant frequency and the inductive power transmitter generates a driving voltage across the primary inductor at a transmission frequency significantly different from the first resonant frequency. Typically, the transmission frequency is higher than the first resonant frequency. Alternatively, the transmission frequency is lower than the first resonant frequency.

Generally, when the resonance-altering component is connected to the reception circuit, the inductive transfer system has a second resonant frequency. Typically, the resonance-altering component is selected such that the transmission frequency is closer to the second resonant frequency than the first resonant frequency. Optionally, the resonance-altering component may be selected such that the second resonant frequency is higher than the first resonant frequency. Alternatively, the resonance-altering component may be selected such that the first resonant frequency is higher than the second resonant frequency.

According to various embodiments, the resonance-altering component comprises a capacitor. According to other embodiments, the resonance-altering component comprises an inductor. Optionally, the resonance-altering component comprises a capacitor selectively connectable in parallel to the secondary inductor.

Optionally, the switching unit comprises at least one power MOSFET. Typically, the switching unit is configured to connect the resonance-altering component when the output voltage is less than a threshold value.

Some embodiments of the inductive power receiver include a comparator configured to compare the output voltage across with at least one reference value. Accordingly, the switching unit may be configured to connect the resonance-altering component to the receiver circuit when the output voltage is less than a first reference value. Typically, the switching unit is configured to disconnect the resonance-altering component from the receiver circuit when the output voltage is above the first reference value. Optionally, the regulator may be further configured to disconnect the secondary inductor from the receiver circuit when the output voltage is higher than a second reference value. Accordingly, the regulator is further configured to connect the secondary inductor to the receiver circuit when the output voltage is lower than the second reference value.

A method is taught for regulating output voltage from a reception circuit of an inductive power transfer system, the method comprising the steps: step (a)—driving a primary inductor at a transmission frequency different from a first resonant frequency of the inductive power transfer system; step (b)—inducing a secondary voltage across a secondary inductor associated with the reception circuit; step (c)—monitoring the output voltage from the reception circuit; step (d)—comparing the output voltage with a first reference value; and step (e)—if the output voltage is less than the first reference value, connecting a resonance-altering component to the reception circuit such that the resonant frequency of the inductive power transfer system shifts closer to the transmission frequency.

Variously, the method may further comprise at least one of the additional steps, step (f)—if the output voltage is above a second reference value, disconnecting the secondary inductor from the reception circuit, step (g)—disconnecting the resonance-altering component from the reception circuit when the output voltage equals the first reference value, and step (h)—reconnecting the secondary inductor from the reception circuit when the output voltage equals the second reference value.

According to other embodiments, an electrical device is presented incorporating the inductive power receiver. Variously, the electrical device may be selected from a group consisting of: telephones, media players, PDAs, Walkmans, portable music players, dictaphones, portable DVD players, mobile communications devices, standing lamps, video recorders, DVD players, paper shredders, fans, photocopiers, computers, printers, cooking appliances, fridges, freezers, washing machines, clothes dryers, heavy machinery, desk lamps, ambient lighting units, fans, wireless telephones, speakers, speaker phones, conference call base units, electric pencil sharpeners, electric staplers, display devices, electronic picture frames, VDUs, projectors, televisions, video players, music centers, calculators, scanners, fax machines, hot plates, electrically heated mugs, mobile phones, hairdryers, shavers, defoliators, delapidators, heaters, wax-melting equipment, hair curlers, beard trippers, bathroom-scales, lights and radios, egg beaters, bread-makers, liquidizers, citrus juice extractors, vegetable juicers, food-processors, electric knives, toasters, sandwich toasters, waffle makers, electrical barbecue grills, slow cookers, hot-plates, deep-fat fryers, electrical frying pans, knife sharpeners, domestic sterilizers, kettles, urns, radios, cassette players, CD players and electrical tin-openers, popcorn makers and magnetic stirrers and the like.

Another inductive power receiver is presented having a reception circuit configured to inductively couple with an inductive power transmitter to form an inductive transfer system, the reception circuit comprising at least one secondary inductor configured to inductively couple with a primary inductor associated with the inductive power transmitter; a regulator, configured to regulate an output voltage of the reception circuit; and a capacitance element connected across the terminals of secondary inductor such that current through the primary inductor has a smooth half-sinewave profile. Optionally, the regulator may comprise at least one step-down DC/DC converter. Additionally or alternatively, the regulator may comprise at least one O-ring diode.

BRIEF DESCRIPTION OF THE FIGURES

For a better understanding of the embodiments and to show how it may be carried into effect, reference will now be made, purely by way of example, to the accompanying drawings.

With specific reference now to the drawings in detail, it is stressed that the particulars shown are by way of example and for purposes of illustrative discussion of selected embodiments only, and are presented in the cause of providing what is believed to be the most useful and readily understood description of the principles and conceptual aspects. In this regard, no attempt is made to show structural details in more detail than is necessary for a fundamental understanding; the description taken with the drawings making apparent to those skilled in the art how the several selected embodiments may be put into practice. In the accompanying drawings.

DESCRIPTION OF THE SELECTED EMBODIMENTS

Figure 1:
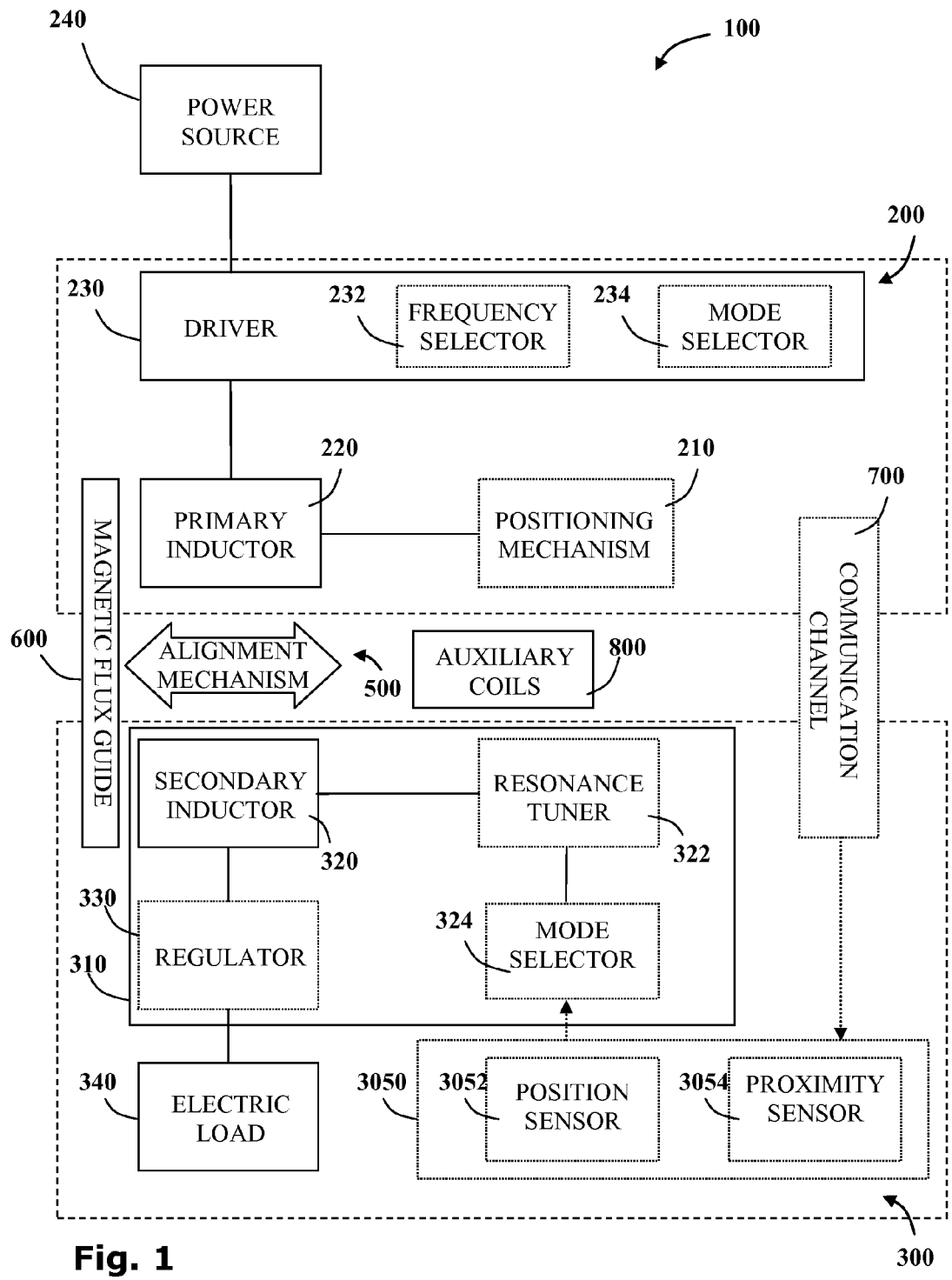
FIG. 1 is a block diagram showing the main elements of an inductive power transfer system operable to provide power inductively from an inductive power transmitter to an inductive power receiver over an extended region.

Reference is now made to FIG. 1 which shows a block diagram showing various elements of an inductive power transfer system 100 operable to provide power inductively from an inductive power transmitter 200 to an inductive power receiver over an extended region.

The inductive power transmitter 200 includes a primary inductor 240, a driver 230, and optionally a positioning mechanism 210. The inductive power transmitter 200 may be connected to a power source 240 such as a mains electricity socket, a transformer, a power pack, solar panel or the like. The driver 230 is operable to provide a variable electric potential across the primary inductor 220 at a selected driving frequency thereby producing an oscillating magnetic field in the vicinity of the primary inductor 220. It is noted that such an oscillating magnetic field may be used to induce an electric potential in a secondary inductor 320 of a nearby inductive receiver 300.

The inductive power receiver 300 includes a secondary inductor 320 which may be wired to an electric load 340 via a reception circuit 310. When the secondary inductor 320 is placed inside the oscillating magnetic field produced by a primary inductor 220, an oscillating induced voltage is generated.

The power reception range over which the inductive power receiver 300 may receive power from the inductive power transmitter 200 may depend upon a number of factors including the strength and extension of the oscillating magnetic field, the size and position of the primary inductor, the frequency of power transfer, the resonant frequency of the reception circuit 310, the efficiency of power transfer and the like.

Features of the inductive power transmission system 100 described herein may allow the power reception range to be extended allowing efficient inductive power transfer over a larger region. In particular, the system 100 may be configured to have multiple operational modes such as a tightly coupled mode, for allowing efficient inductive power transfer over short range, where the primary inductor 220 may be aligned to the secondary inductor 320 and a loosely coupled mode, for allowing efficient inductive power transfer over longer ranges.

Transmitter side features of the system 100 may include, inter alia, the positioning mechanism 210, which may be provided to move the primary inductor 220 into a position more suitable for inductive transfer of power to an inductive receiver 300. For example, when the inductive power transfer system 100 is operating in tightly coupled mode, the positioning mechanism 210 may be used as at least part of an alignment mechanism 500 to align the primary inductor 220 to the secondary inductor 320. Accordingly actuators may be provided to move the primary inductor 220 within a target region. Various positioning systems may be used in combination with the inductive power transfer system, for example, such as described hereinbelow in reference to FIGS. 11-15. When the inductive power transfer system 100 is operating in loosely coupled mode, the positioning mechanism 210 may also be used to position the primary inductor 220 more advantageously to better transmit power for example to provide line of sight between primary inductor 220 and secondary inductor 320 where this may improve efficiency or the like.

Receiver side features of the system 100 may include, inter alia, the reception circuit 310 which may include a regulator 330 provided to regulate the output voltage into a form suitable for the electric load 340. According to various systems, the regulator 330 may include rectification circuits, voltage control circuits, current control circuits or the like. Optionally, the inductive power receiver 300 may further include a resonance tuner 322 which may be used to adjust the resonant frequency of the reception circuit 310 to suit requirements. An example of such a system is described below in reference to FIG. 4.

It is noted that the inductive power transmission system 100 may further include a communication channel 700 and an alignment mechanism 500. The communication channel 700 is provided to allow communication between the inductive power receiver 300 and the inductive power transmitter 200. Data may be passed between the inductive power receiver 300 and the inductive power transmitter 200 pertaining to their relative positions, identification, operational parameters such as required operating voltage, current, temperature or power for the electric load 340, the measured voltage, current, temperature or power supplied to the electric load 340 during operation, the measured voltage, current, temperature or power received by the electric load 340 during operation, and the like. Furthermore, the communication channel 700 may be used to communicate feedback signals from the receiver 300 to the transmitter 200 instructing the driver 230 to adjust operating parameters such as driving voltage, current or frequency.

Various communication channels 700 may be used for the system such as a light emitting diode sending encoded optical signals over short distances to a photo-transistor for example. For purposes of illustration, an optical transmitter, such as a light emitting diode (LED) for example, may be incorporated within the secondary unit 300 and configured to transmit electromagnetic radiation of a type and intensity capable of penetrating the casings of both the secondary unit 300, and the power outlet 200. An optical receiver, such as a photodiode, a phototransistor, a light dependent resistor or the like, may be incorporated within the power outlet 200 for receiving the electromagnetic radiation.

In systems where alignment between the transmitter and receiver may be difficult to achieve, optical signaling may be inappropriate and alternative communication channels may be preferred such as ultrasonic signals transmitted by piezoelectric elements or radio signals such as Bluetooth, WiFi and the like. Alternatively the primary and secondary inductors 220, 320 may themselves transfer communication signals using current and/or voltage modulation, frequency modulation or the like.

The alignment mechanism 500 is provided to enable the alignment between the primary inductor 220 and the secondary inductor 320. This may be of particular use when the inductive power transfer system 100 is operating in tightly coupled mode. Good alignment between primary inductor 220 and secondary inductor 320 may improve the efficiency of energy transfer and reduce electromagnetic radiation into the environment.

The alignment mechanism 500 may include a positioning mechanism 210, such as described hereinbelow with reference to FIGS. 11 to 15, an alignment magnet configured to anchor the secondary inductor 320 to the primary inductor 220, a visual indication, an audio indication, a tactile indication or the like. Examples of alignment mechanisms may be found in the applicants copending U.S. patent application Ser. No. 12/524,987, which is incorporated herein by reference.

The alignment mechanism 500 may further include a magnetic flux guide 600. The magnetic flux guide 600 is provided to direct magnetic flux from the primary inductor 220 to the secondary inductor 320 and to reduce flux leakage to the surroundings particularly when operating in tightly coupled mode. The magnetic flux guide 600 may include a ferromagnetic core and a magnetic shield. The ferromagnetic core may be provided to guide magnetic flux from an active primary inductor to the secondary inductor.

For the purposes of illustration only, one such ferromagnetic core may be constructed, for example, from amorphous ferromagnetic material, possibly cut into wafers from a sheet approximately 20 microns thick or so. The ferromagnetic core may consist of two amorphous ferromagnetic wafers. A first wafer may be adhered to the primary inductor 220 and a second wafer may be adhered to the first wafer. The two wafers may then serve as a ferromagnetic core guiding magnetic flux from a primary inductor to the secondary inductor 320. Optionally the ferromagnetic wafers may have a radial slits to prevent the buildup of eddy currents within the wafer due to the oscillating magnetic field produced by the primary inductor 220. Where the wafer has a circular cross section, the slit may extend inwardly diametrically from the circumference.

The magnetic shield may be provided to prevent flux leakage into the surroundings. The magnetic shield may be fabricated from a sheet of thin amorphous ferromagnetic material and may be adhered to a printed circuit board by an adhesive insulating layer.

It will be appreciated that a magnetic shield is of particular importance when the inductive receiver 300 is mounted upon a conductive surface or a device containing conductive components. Thus, for example, when such an inductive power receiver 300 is mounted upon an electrical device, such as a computer, mobile telephone or the like, the magnetic shield may prevent magnetic flux from leaking into the metallic components of the electrical device and causing them to heat up.

Amorphous ferromagnetic sheets may have a thickness of around 20 microns. When laminated by a polymer laminate on both sides the overall thickness of the sheet is around 60 microns. Thus, in contradistinction to other ferrite elements used to guide magnetic flux in inductive systems, amorphous ferromagnetic materials may be used to fabricate an extremely thin magnetic guide. A thin magnetic guide in turn allows the inductive power receiver to be flexible and unobtrusive. It will be appreciated that these considerations are very important in the design and manufacture of device mounted inductive receivers. Various methods of fabricating magnetic guiding elements from amorphous ferromagnetic material include, inter alia: printing, stamping, cutting, amorphous ferromagnetic microwire cloth and the like.

Other magnetic flux guides 600 may be used in combination with the inductive power transfer system as appropriate.

Accordingly when the inductive power transfer system 100 is operating in tightly coupled mode, with the inductive power receiver 300 is aligned to the inductive power transmitter 200, the magnetic field lines are generally closed reducing possible magnetic radiation to the environment during operation.

As indicated above, it is a particular feature of the inductive power transfer system 100, described herein that it may be configured to operate in a plurality of modes such as tightly coupled mode, loosely coupled mode or the likeas appropriate. Accordingly, a transmitter-side mode selector 234 and/or a receiver-side mode selector 324 may be provided to switch the inductive power transfer system between the various operational modes.

According to various multi-mode inductive power transfer systems 100, mode selectors 234, 324 may be manual or automatic. Optionally, an automatic mode trigger mechanism 3050 may be provided to monitor the relative positions of the inductive power transmitter 200 and the inductive power receiver 300 and to select coupling mode as appropriate. Such a mode trigger 3050 may include sensors such as position sensors 3052, proximity sensors 3054 or the like.

Figure 2:
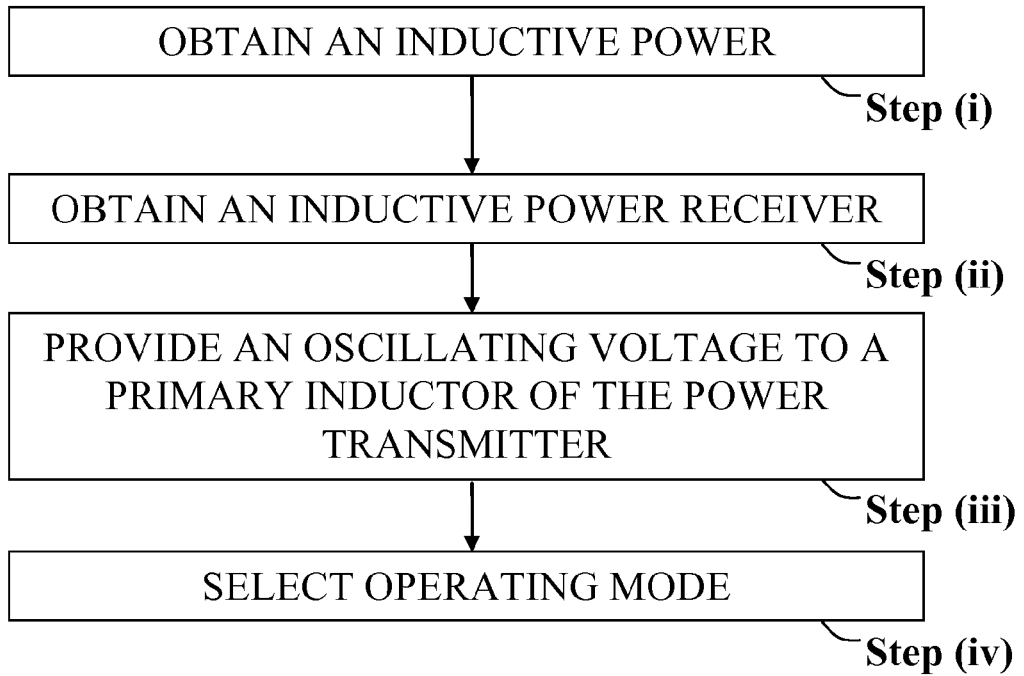
FIG. 2 is a flowchart of a method is represented for transferring power inductively to at least one electrical load.

Referring now to the flowchart of FIG. 2, a method is represented for transferring power inductively to at least one electrical load. The method includes the steps of: obtaining an inductive power transmitter comprising a driver and a primary inductor—step (i); obtaining an inductive power receiver comprising a secondary inductor connected to the electrical load, the inductive power receiver being operable in at least two modes, including a tight coupling mode and a loose couping mode—step (ii); providing an oscillating potential difference across the primary inductor, possibly via a driving unit—step (iii); and selecting an operating mode for the inductive receiver—step (iv).

Figure 3:
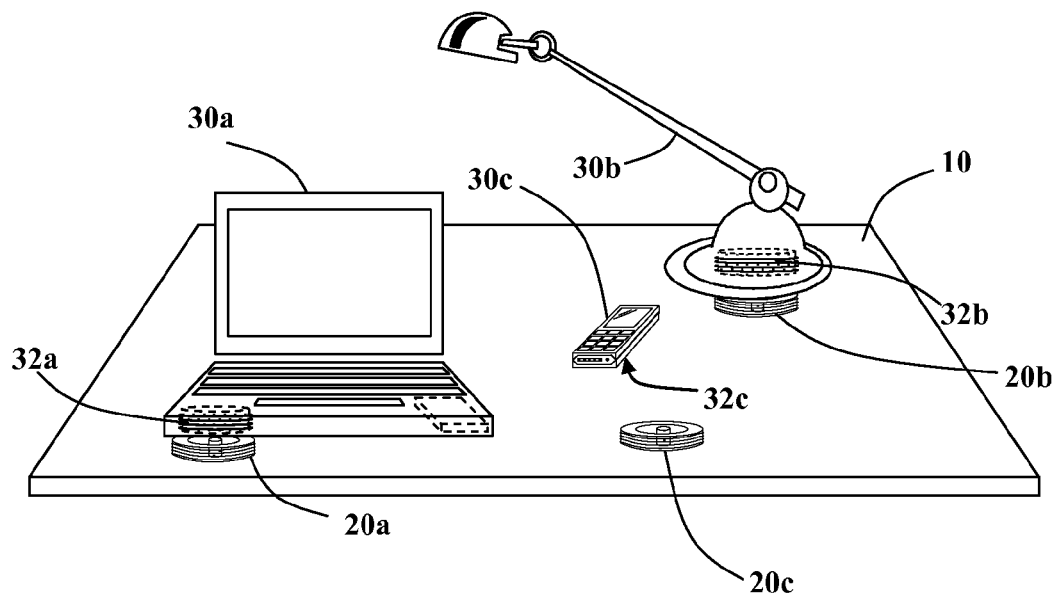
FIG. 3 is a schematic representation of an illustrative example of an inductively enabled platform providing power to electrical devices in tightly coupled and loosely coupled modes.

Referring now to FIG. 3, a schematic representation is shown of an illustrative example of an inductively enabled platform 10. The platform 10, which may be a table top, inductive mat or the like, includes a plurality of embedded inductive power transmitters 20a-c. The inductive power transmitters 20a-c are configured to transfer power inductively to inductive power receivers 32a-c incorporated into various electrical appliances. A computer 30a is positioned such that an integrated inductive power receiver 32a is aligned to a first inductive power transmitter 20a, accordingly the first inductive power transmitter 20a may operate in tightly coupled mode. A desk lamp 30b is positioned such that its integrated inductive power receiver 32b is in alignment with a second inductive power transmitter 20b, accordingly the second power transmitter may also operate in tightly coupled mode. Thus power may be transferred to the computer 30a and the desk lamp 30b in an efficient manner with very little electromagnetic radiation leaking therefrom.

It will be noted that although a third inductive power transmitter 20c is available and a telephone 30c having an integrated inductive power receiver 32c is placed upon the platform, the telephone's inductive power receiver 32c is not aligned to the third inductive power transmitter 20c. It is a feature of the inductive power transfer system described herein that the inductive power transmitter 20c is capable of loosely coupling with a non-aligned inductive power receiver 32c such that the telephone 30c may be charged remotely.

Accordingly, referring back to FIG. 1, the inductive power system 100 may be provided with at least one resonance tuner 322 operable to match the driving frequency of the inductive power transmitter 200 to the resonant frequency of the reception circuit 310.

The strength of an induced voltage in the secondary inductor of an inductive couple varies according to the oscillating frequency of the electrical potential provided to the primary inductor. The induced voltage is strongest when the oscillating frequency equals the resonant frequency of the system. The resonant frequency $f_R$ of the system depends upon the inductance L and the capacitance C of the system according to the equation $$f_R = \frac{1}{2\pi\sqrt{LC}}.$$

The value of the inductance L and the capacitance C of the system are themselves dependent upon a number of parameters such as the inductance of the primary inductor, inductance of the secondary inductor, the distance therebetween, the geometry of the system, the mutual inductance, the capacitance of reception and transmission circuits and the like. As some of these parameters are likely to be variable in inductive transfer system, determination and tuning of the natural resonant frequency $f_R$ may be desirable.

A receiver-side resonance tuner 322 may include a variable capacitor or bank of capacitors selectively connectable to the reception circuit 310 so as to vary the resonant frequency $f_R$. Alternatively, or additionally, a receiver-side resonance tuner 322 may include a variable inductor or bank of inductors selectively connectable to the reception circuit 310 so as to vary the resonant frequency $f_R$ in order to match the driving frequency of the inductive power transmitter.

Receiver Side Resonance Tuner

Figure 4:
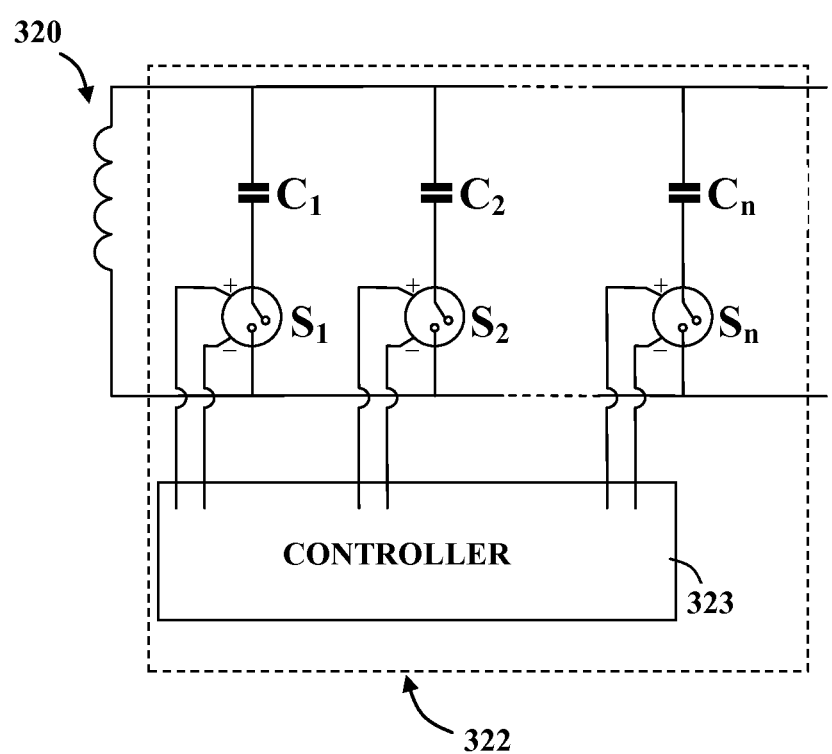
FIG. 4 is a circuit diagram schematically representing a possible example of a resonance tuner connected to a secondary inductor.

Reference is now made to FIG. 4 schematically representing a circuit diagram of a possible example of a resonance tuner 322 connected to a secondary inductor 320. The resonance tuner 322 includes a controller 323, a plurality of capacitors $C_{1-n}$ and a plurality of switches $S_{1-n}$.

The controller 323 is configured and operable to selectively activate the switches $S_{1-n}$ to connect capacitors $C_{1-n}$ to the secondary inductor 320 thereby adjusting the natural resonant frequency of the reception circuit.

The controller 323 may comprise a processor executing an algorithm directed towards tuning the reception circuit in order to achieve a desired efficiency of power transfer. In particular, in loosely coupled mode, the controller may tune the reception circuit such that the resonant frequency matches the driving frequency of the primary inductor 220. Alternatively, where non resonant transmission is required, such as in tightly coupled mode for example, the controller may tune the reception circuit to a frequency higher or lower than the range of the driving frequency of the primary inductor.

It is noted that capacitors $C_{1-n}$ of a variety of capacitance values may be connected in parallel or series to the reception circuit, according to various duty cycles in order to achieve the desired tuning. Alternatively, a plurality of capacitors with similar capacitance values may be provided which may be selectively switched into the circuit as required. Furthermore, such a capacitor bank may be used to regulate inductive power transfer at a constant driving frequency by tuning the circuit closer and further from resonance as required. Alternatively, frequency modulation may be used in combination with such receiver side power regulation.

In still other systems, the transmitter-side resonance tuner may be provided. For example, the driver 230 of the inductive power transmitter 200 may include a frequency selector 232 adapted to select a driving frequency resonant with the reception circuit 310 of the inductive power receiver 300. Where appropriate, the communication channel may be used to send signals indicating desired frequency.

It is a feature of resonant power transfer that power is substantially delivered to the resonant reception circuit. It will be appreciated, therefore, that a driving frequency may be selected such that power may be provided from an inductive power outlet to a particular inductive power receiver or set of receivers. Thus in loosely coupled mode, resonant power transfer may be provided where required.

It is noted however that when the system is operating in the tightly coupled mode, non-resonant power transfer may be preferred. One advantage of non-resonant power transmission in tightly coupled mode is that any lateral displacement of the secondary power receiving unit changes the alignment between the secondary inductor 320 and the primary inductive coil 220. As a result of the changing alignment, the combined inductance of the coil pair changes which in turn changes the resonant frequency of the system. If the inductive power outlet 200 transmits power at the resonant frequency of the system, even a small lateral movement would reduce significantly the amplitude of the induced voltage. Where the inductive power outlet 200 transmits power at a non-resonant frequency where the slope of the resonance graph is much shallower, the system has a much larger tolerance of variations such as lateral movement. Another advantage of non-resonant transmission is that the transmission frequency may be used to regulate power transfer. Various non-resonant inductive power transfer systems may be used with the system such as described in the applicants copending U.S. patent application Ser. No. 12/883,457, the contents of which are incorporated herein by reference.

Frequency Selection

Inductive power transfer systems may be configured to transmit power at the resonant frequency of the inductive couple or alternatively to transmit at non-resonant frequencies. In either case, it is useful to know the natural resonant frequency of the system. Tuning mechanisms may be employed in order to maintain transmission at the desired frequency.

The inductive power transmission system may be manufactured according to strict specifications such that the resonance frequency is determined in advance. It is noted however that such strict specifications may impose limitations upon the tolerance of the manufacturing processes. Consequently many otherwise operational products of the manufacturing processes may be rejected during quality control. It will be appreciated that such limitations introduce significant extra overheads thereby greatly increasing the cost of manufacture of the system. Therefore systems having predetermined resonance frequencies are very difficult to mass produce in an economically viable manner.

Embodiments described below provide inductive power transmission systems which may be able to sense their own resonant frequency during operation.

Non-Resonant Operation

Figure 5:
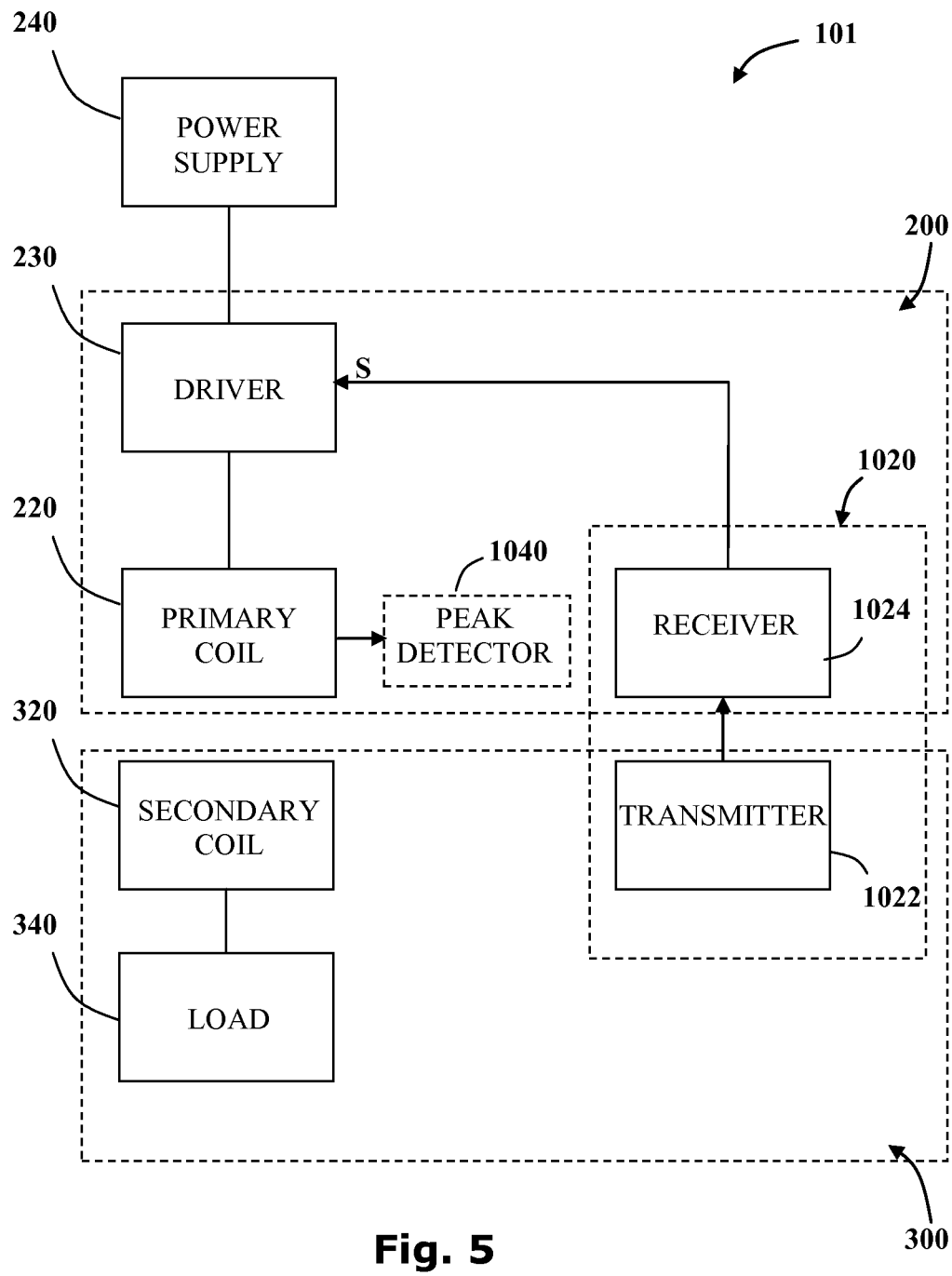
FIG. 5 is a block diagram showing the main elements of an inductive power transfer system with a feedback signal path.

Reference is now made to FIG. 5 showing a block diagram of the main elements of an inductive power transfer system 101 adapted to transmit power at a non-resonant frequency. The inductive power transfer system 101 consists of an inductive power outlet 200 configured to provide power to a remote secondary unit 300. The inductive power outlet 200 includes a primary inductive coil 220 wired to a power source 240 via a driver 230. The driver 230 is configured to provide an oscillating driving voltage to the primary inductive coil 220.

The secondary unit 300 includes a secondary inductive coil 320, wired to an electric load 340, which is inductively coupled to the primary inductive coil 220. The electric load 340 draws power from the power source 240. A communication channel 1020 may be provided between a transmitter 1022 associated with the secondary unit 300 and a receiver 1024 associated with the inductive power outlet 200. The communication channel 120 may provide feedback signals S and the like to the driver 230.

In some embodiments, a voltage peak detector 1040 is provided to detect large increases in the transmission voltage. The peak detector 1040 may be used to detect irregularities such as the removal of the secondary unit 200, the introduction of power drains, short circuits or the like.

Figure 6:
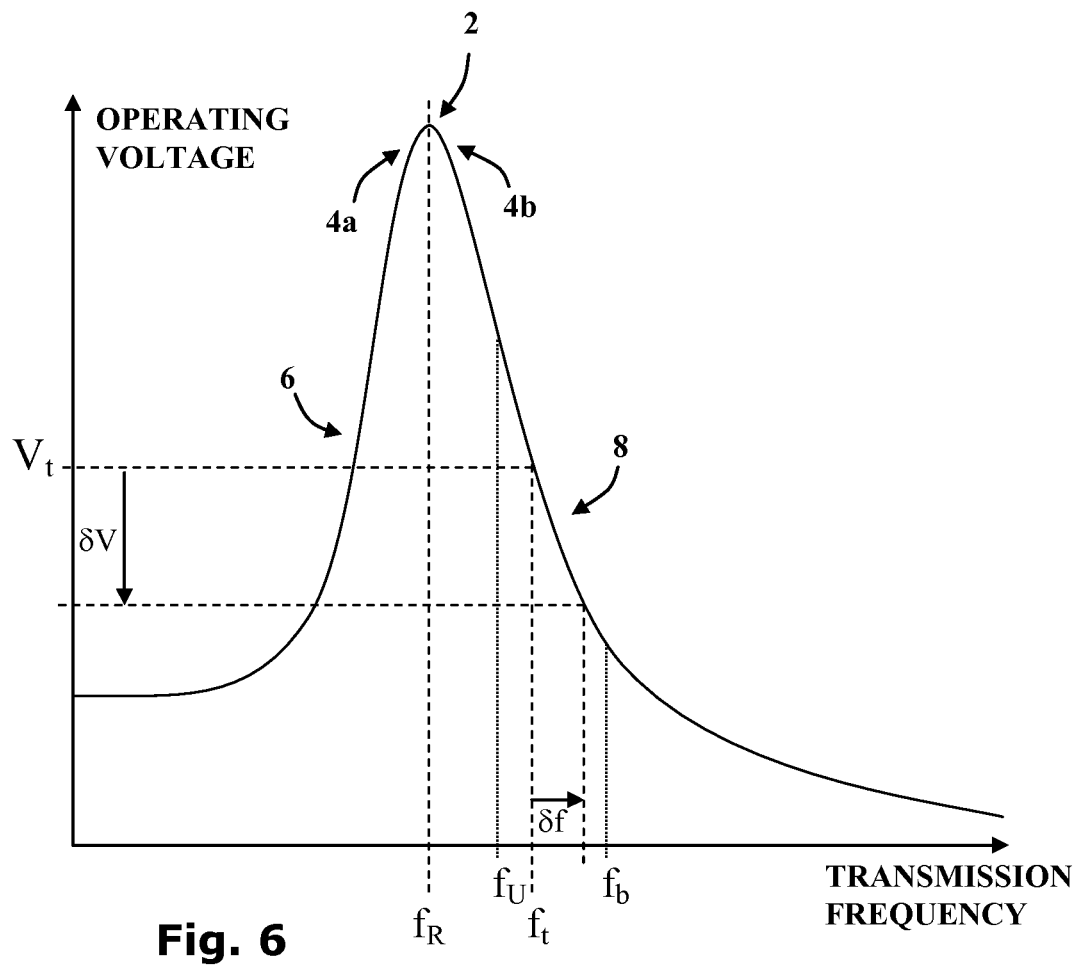
FIG. 6 is a graph of the frequency profile of an inductive power transfer system showing how the amplitude of operational voltage varies with transmission frequency.

FIG. 6 is a graph showing how the amplitude of the operational voltage of an inductive power transfer system varies according to the transmission frequency. It is noted that the voltage is at its highest when the transmission frequency is equal to the resonant frequency $f_R$ of the system, this maximum amplitude is known as the resonance peak 2. It is further noted that the slope of the graph is steepest in the regions 4a, 4b to either side of the resonance peak 2. Thus in inductive transfer systems, which operate at or around resonance, a small variation in frequency results in a large change in induced voltage. Similarly, a small change in the resonant frequency of the system results in a large change in the induced voltage. For this reason prior art resonant inductive transfer systems are typically very sensitive to small fluctuations in environmental conditions or variations in alignment between the induction coils.

It is a particular feature that the driver 230 (FIG. 5) is configured and operable to transmit a driving voltage which oscillates at a transmission frequency which is substantially different from the resonant frequency of the inductive couple. Preferably the transmission frequency is selected to lie within one of the near-linear regions 6, 8 where the slope of the frequency-amplitude graph is less steep.

Sensitivity to Lateral Movement

Figure 7:
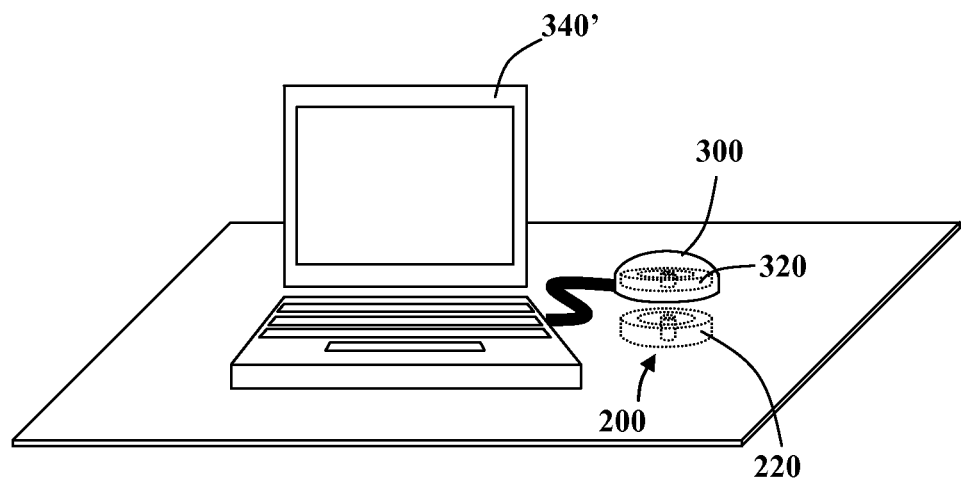
FIG. 7 is a schematic diagram representing a laptop computer drawing power from an inductive power outlet.

One advantage of this embodiment of operation at a non-resonant frequency may be demonstrated with reference now to FIG. 7. A schematic diagram is shown representing a laptop computer 340 drawing power from an inductive power outlet 200 via a secondary power receiving unit 300.

The power receiving unit 300 includes a secondary inductive coil 320 which is aligned to a primary inductive coil 220 in the inductive power outlet 200. Any lateral displacement of the secondary power receiving unit 300 changes the alignment between the secondary inductive coil 320 to the primary inductive coil 220. As a result of the changing alignment, the combined inductance of the coil pair changes which in turn changes the resonant frequency of the system.

If the inductive power outlet 200 transmits power at the resonant frequency of the system, even a small lateral movement may significantly reduce the amplitude of the induced voltage. In contradistinction to resonant systems, a non-resonant inductive power outlet 200 transmits power at a frequency in one of the regions 6, 8 to either side of the resonance peak 2 (FIG. 6) where the slope of the resonance graph is much shallower. Consequently, the system has a much larger tolerance of variations such as lateral movement.

Transmission Guard

A further feature of embodiments of inductive power outlets transmitting at frequencies above the natural resonant frequency of the system is that if the resonant frequency of the system increases for some reasons, then the transmission voltage increases sharply. In preferred embodiments, a peak detector 1040 (FIG. 5) is be provided to monitor the transmission voltage of the power outlet 200 and is configured to detect large increases in the transmission voltage indicating an increase in resonant frequency.

Referring again to the resonant formula for inductive systems, $$f_R = \frac{1}{2\pi\sqrt{LC}},$$

it is noted that any decrease in either the inductance L or the capacitance C of the system increases the resonant frequency and may be detected by the peak detector 140.

As an example of the use of a peak detector 1040, reference is again made to FIG. 7. It will be appreciated that in a desktop environment, conductive bodies such as a paper clip, metal rule, the metal casing a stapler, a hole-punch or any metallic objects may be introduced between the inductive power outlet 200 and the secondary power receiving unit 300. The oscillating magnetic field produced by the primary coil 220 would then produce eddy currents in the conductive body heating it and thereby draining power from the primary coil 220. Such a power drain may be wasteful and/or dangerous. Power drains such as described above generally reduce the inductance L of the system thereby increasing its resonant frequency.

The inductance L of the system may also be reduced by the removal of the secondary coil 220, the creation of a short circuit or the like. A peak detector 1040, wired to the inductive power outlet, may detect any of these scenarios as a large increase in transmission voltage. Where required, the power transfer system may be further configured to shut down, issue a warning or otherwise protect the user and the system in the event that the peak detector 1040 detects such an increase in transmission voltage.

Power Regulation Using a Non-Resonant Operating Frequency

Another advantage of non-resonant transmission is that the transmission frequency may be used to regulate power transfer. Prior art inductive power transfer systems typically regulate power transfer by altering the duty cycle of the transmission voltage. Unlike prior art systems, because embodiments of the present invention transmit at a frequency not equal to the resonant frequency of the system, the driver 230 may be configured to regulate power transfer by adjusting the transmission frequency.

The regulation is illustrated with reference to FIG. 6. In embodiments of the invention, the frequency of transmission may be selected to be in the approximately linear region 8 of the curve between a lower frequency value of $f_L$ and an upper frequency value of $f_U$. A transmission frequency $f_t$, higher than the resonant frequency $f_R$ of the system, produces an induced voltage of $V_t$. The induced voltage can be increased by reducing the transmission frequency so that it is closer to the resonant frequency $f_R$. Conversely, the induced voltage may be reduced by increasing the transmission frequency so that it is further from the resonant frequency $f_R$. For example, an adjustment of transmission frequency by $\delta f$ produces a change in induced voltage of $\delta V$.

For the reasons outlined above, the operating frequency of the system is preferably selected from a relatively narrow frequency range lying within the near-linear regions 6, 8 (FIG. 6) of the amplitude graph. It will be appreciated therefore that the selection of the operating frequency may depend upon prior knowledge of the natural frequency $f_R$ of the resonant system. For example, where the resonant frequency $f_R$ is a known characteristic of the system, the target frequency ranges may be determined by multiplying the natural frequency $f_R$ by a scaling factor. Accordingly, in certain embodiments, the optimal operating frequency may be selected from the range between say 50-90% of the natural frequency $f_R$ or alternatively between 110-160% of the natural frequency $f_R$ of the system, or some other such defined range.

Natural Frequency Determination

It will be appreciated therefore, that, according to some embodiments, it may be convenient for the system parameters to be strictly constrained during production such that the natural frequency $f_R$ of the system is predetermined. However such constraints limit the tolerance of the production process. This is not always economically viable.

It is characteristic of wireless inductive power transfer systems that they generally involve both an inductive power outlet module and an inductive power receiver module. The resonance of the system is determined by the combination of both these modules. A single inductive power output module may be coupled to a number of individual inductive power receiver modules having different characteristics and each producing an inductive coupling with different natural frequencies. Thus, prediction of the natural resonant frequency of the coupling during manufacture of the inductive power outlet may be impractical, or unduly limiting.

Moreover, the natural resonant frequency of an inductive coupling may not be stable, the system characteristics of the inductive power transfer system, possibly the inductive power receiver, the inductive power outlet or both may fluctuate over time. Thus, over the lifetime of the system, the predetermined natural frequency of the system may vary significantly.

For at least these reasons, other embodiments of the inductive power transfer system may comprise resonance seeking arrangements configured to determine the natural frequencies of the inductive power transfer system before operation. Once the natural frequency of the system is determined, the operating frequency may be selected from a range defined in terms of its relation to the natural frequency. For example, systems operating in loosely coupled mode may select an operating frequency from a narrow band close to the natural resonant frequency. Alternatively, particularly with systems operating in tightly coupled mode, a non-resonant frequency may be selected from a frequency band above or below the natural resonant frequency.

Figure 8:
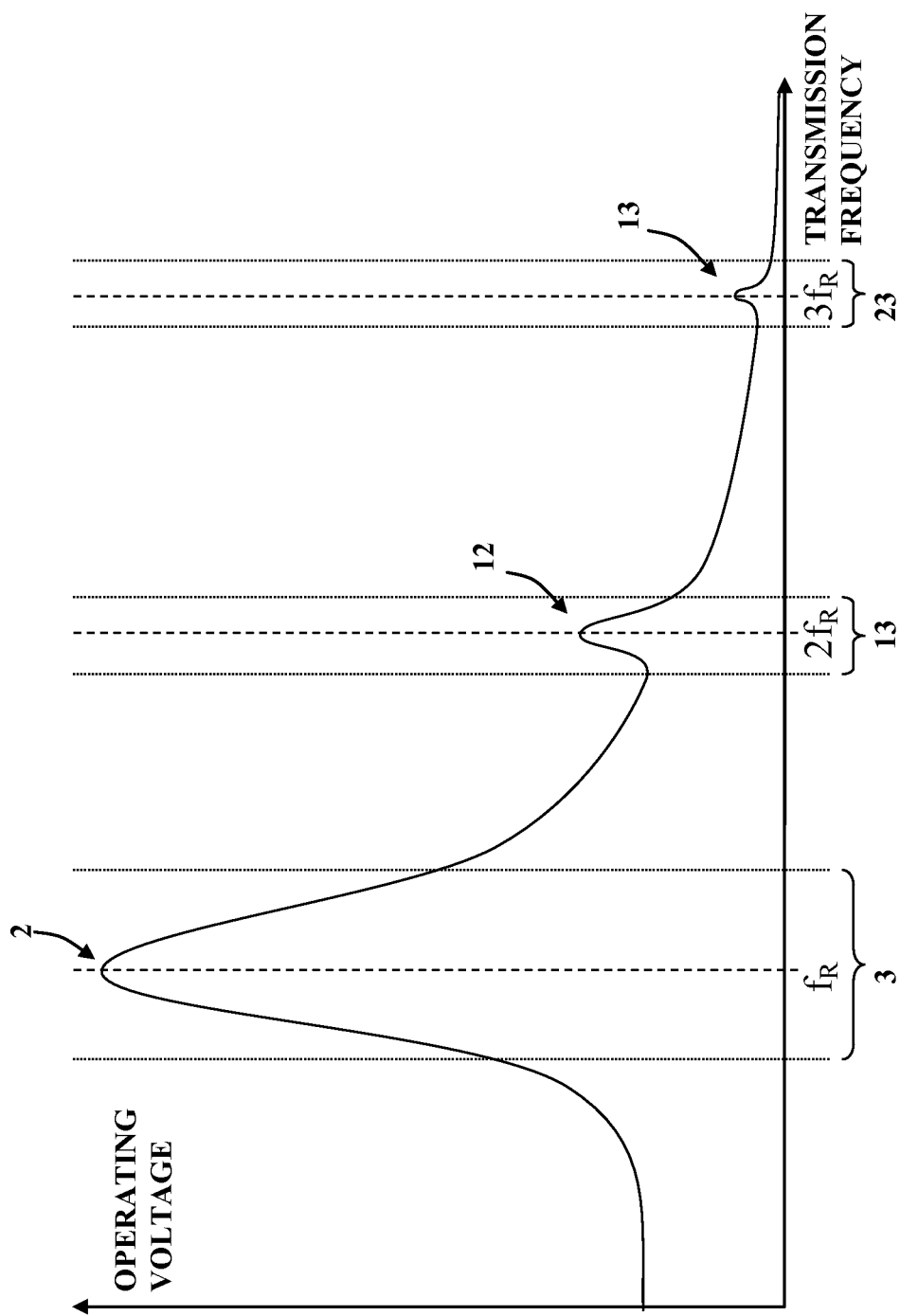
FIG. 8 is a graph representing an extended frequency profile of an inductive power transfer system showing a resonant peak and two harmonic peaks.

Reference is now made to FIG. 8 showing an extended frequency profile of an inductive power transfer system. The profile shows how the amplitude of the operating voltage of the inductive power transfer system varies according to the transmission frequency. It is noted that an amplitude peak 2 is formed at the resonant frequency $f_R$ of the system. In addition, additional smaller harmonic peaks 12, 22 are produced at transmission frequencies of twice $2f_R$ and three times $3f_R$ the resonant frequency $f_R$.

In order to determine the resonant frequency of the inductive power transfer system, the amplitude of the operating voltage may be sampled at a variety of frequencies in order to determine the shape of the profile. The resonant frequency may be determined by selecting the frequency at which the amplitude peaks.

Sampling may be achieved by selecting a set of discrete frequency values from a range 3 around the predicted peak and measuring the amplitude of the operational voltage at each frequency value.

Whilst the discrete sample frequencies may be selected from the range 3 around the predicted resonant frequency $f_R$ and used determine the main resonant peak 2, it is particularly noted that the accuracy of the resonance determination may be improved by sampling the amplitude of the operating voltage at frequencies selected from ranges 13, 23 around multiples of the predicted resonant frequency.

For example, sampling frequencies may be selected within the range 13 of frequencies around twice the predicted resonant frequencies $2f_R$ in order to determine the actual frequency at which the first order harmonic peak 12 are formed. Alternatively, sampling frequencies may be selected within the range 23 of frequencies around three times the predicted resonant frequencies $3f_R$ in order to determine the actual frequency at which the second order harmonic peaks 22 are formed. Indeed sampling frequencies may be selected within ranges around harmonic resonant peaks of any higher order.

If, say, the value of $3f_R$ is thus determined, the resonant frequency $f_R$ may be determined by dividing the monitored value by three. Similarly if the value of $nf_R$ is thus determined, the resonant frequency $f_R$ may be determined by dividing the monitored value by n.

It is further noted that a selected set of sampled values for a limited number of sample frequencies may be used to extrapolate values for other frequencies. Alternatively, interpolation, random sampling or other techniques may be used to find the resonant frequency.

Figure 9:
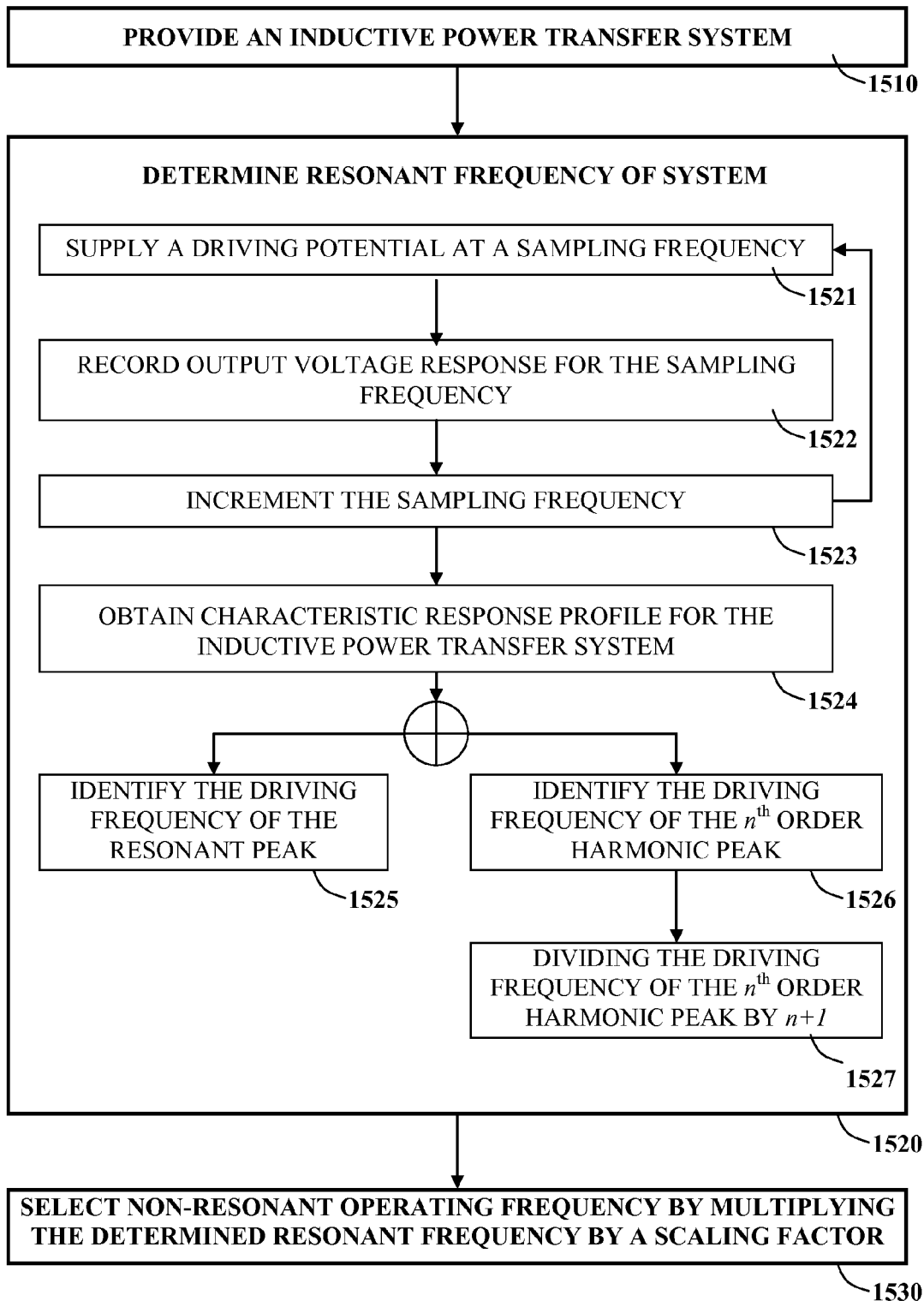
FIG. 9 is a flowchart showing the steps of a possible method for determining the operating frequency for an embodiment of an inductive power transfer system.

Accordingly, referring now to the block diagram of FIG. 9, a method is disclosed herein for calibrating an inductive power transfer system such as described above in order to select a suitable non-resonant operating frequency. The method includes the principle steps of: providing an inductive power transfer system 1510, determining a resonant frequency of the system 1520, and selecting an operating frequency for the inductive transmission of power 1530.

As indicated, where appropriate, the step of determining a resonant frequency 1520 may be performed by a set of sub-steps including supplying a driving potential at a sampling frequency 1521; recording the output voltage response for the sampling frequency 1522; incrementing the sampling frequency 1523; and repeating these steps so as to obtain a characteristic response profile for the inductive power transfer system 1524.

As described above in relation to FIG. 8, the characteristic response profile typically includes a resonant peak and a plurality of harmonic peaks and the resonant frequency may be found by identifying the driving frequency of the resonant peak 1525. Alternatively, the resonant frequency may be found by identifying the driving frequency at a harmonic peak of the $n^{th}$ order 1526 and dividing this value by (n+1) 527.

Once the resonant frequency $f_R$ is determined, the operating frequency may be selected. Typically, a non-resonant operating frequency is selected by multiplying the determined resonant frequency by a scaling factor. The scaling factor may be readily predetermined. According to a particular embodiment the scaling factor is within the range of say 50% to 90%, in other embodiments the range 110% to 150% may be preferred although other ranges will occur as suit requirements.

Optionally, the step of selecting an operating frequency for the inductive transmission of power may involve selecting a non-resonant frequency above or below the natural resonant frequency. Alternatively, the step of selecting an operating frequency for the inductive transmission of power may involve selecting an operating frequency from a range close to the determined resonant frequency.

Figure 10:
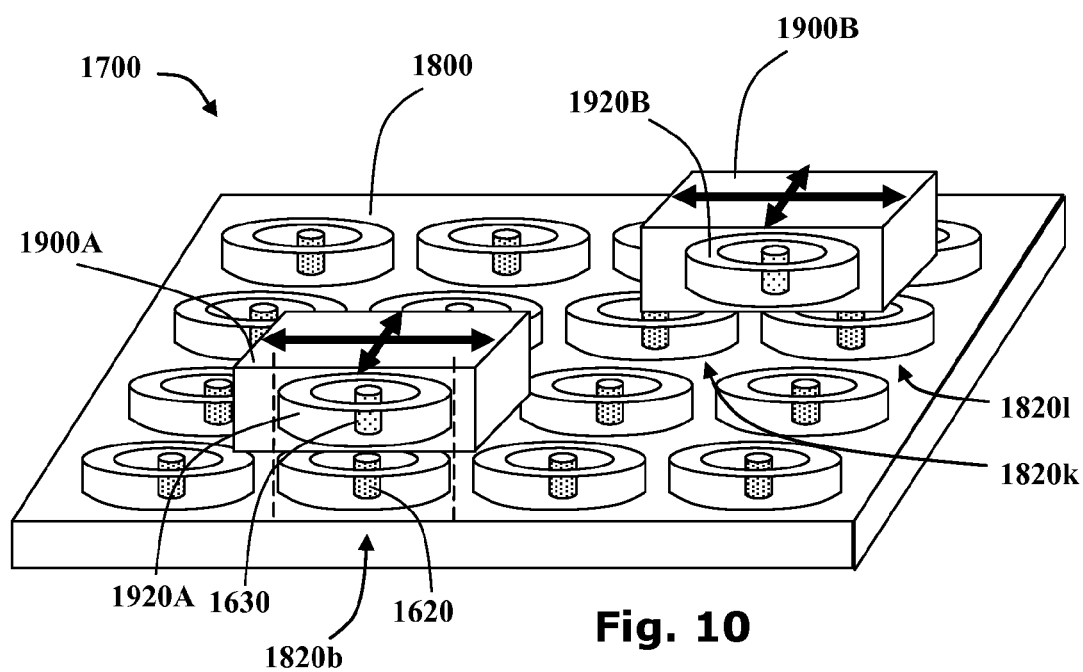
FIG. 10 is a schematic representation of a further inductive power transfer system in which a transmitter including multiple primary inductors provides power to two receivers.

Referring now to FIG. 10, showing a schematic representation of a further inductive power transfer system 1700. An inductive power transmitter 1800 includes multiple primary inductors 1820 arranged in an array. Inductive power receivers 1300 are provided having secondary inductors 1920 configured to receive power inductively from the primary inductors 1820 in loosely or tightly coupled mode. It will be appreciated that typically such inductive power receivers 1900 would be connected to electric loads (not shown).

It is noted that a first inductive receiver 1900A is shown having a secondary inductor 1920A aligned to one primary inductor 1820b and anchored thereto by alignment magnets 1620, 1630. Accordingly, the first inductive receiver may operate in tightly coupled mode, and may operate at a non-resonant frequency if required.

A second inductive receiver 1900B having a secondary inductor 1920B which is not aligned to any particular primary inductor 1820, but placed in between two primary inductors 1820l, 1820k of the array. It is a feature of the dual mode inductive power transfer system that the second inductive power receiver 1900B may be switched to loosely coupled mode such that its resonant frequency is tuned to the driving frequency of at least one of the inductors of the array. Thus power transmission may continue even while the inductive receiver is moved over the surface.

Adjustable Coils

Alignment and Efficiency

In order to achieve high efficiency of transmission over the inductive connection, it is helpful for the secondary inductor to be aligned precisely to the primary inductor. Various methods have been suggested to assist a user to achieve this alignment using visual markings, audio signals and tactile indications of alignment. For example, magnetic snags and anchors have been suggested to provide both tactile feedback to a user as well as to help anchor the secondary inductor to the primary inductor once alignment has been achieved. Nevertheless, it is generally necessary for the user to align the inductive power receiver to the inductive power outlet carefully before the inductive connection is established.

It would be much more convenient for a user to be able to position an inductive power receiver at any location over an extended surface and for the alignment to be effected automatically. Thus positioning mechanisms are disclosed herein for aligning the primary inductor to the secondary inductor automatically.

General Alignment System

Figure 11:
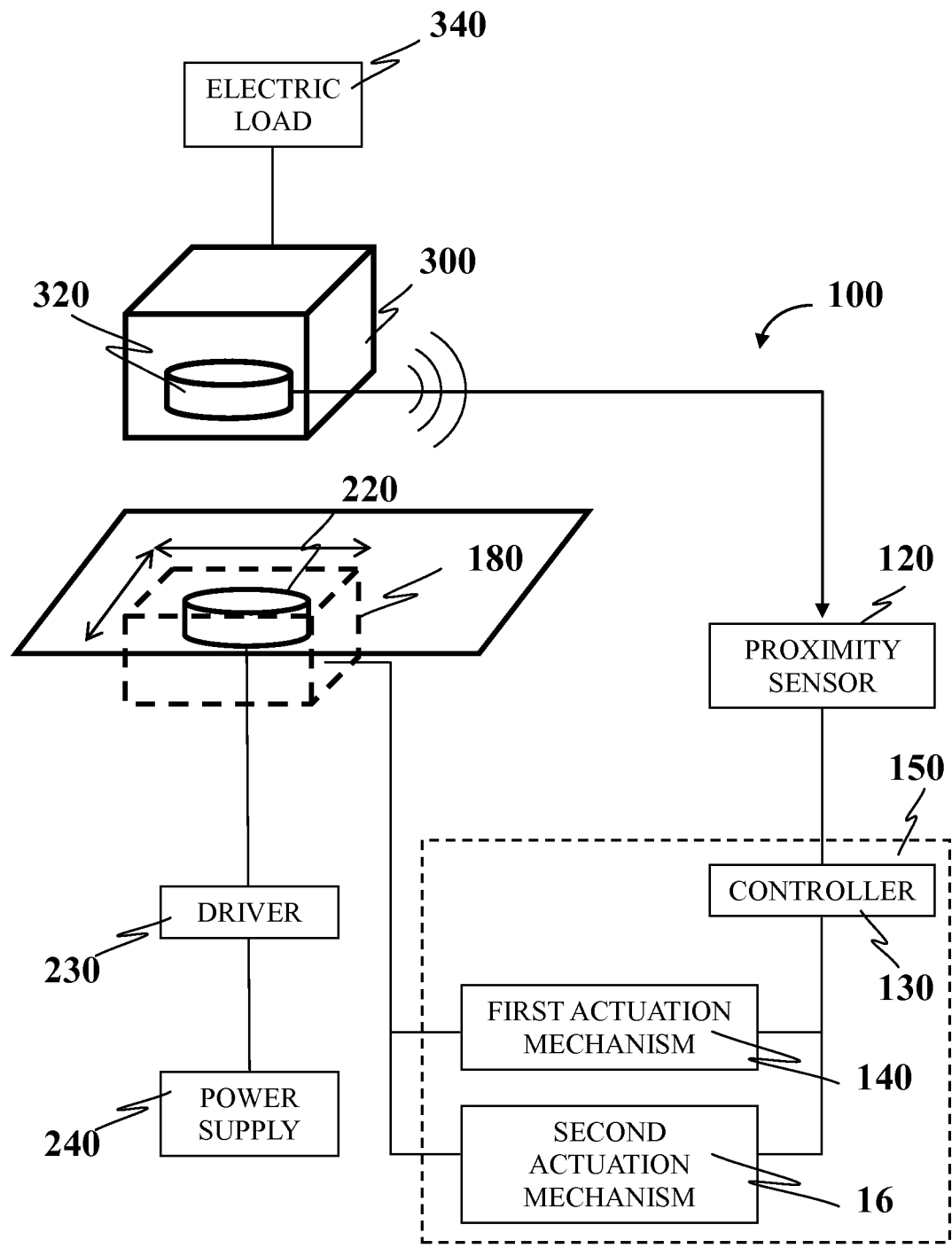
FIG. 11 is a schematic diagram representing the main components of an inductive power outlet incorporating an automatic alignment system.

Reference is now made to the schematic diagram of FIG. 11 which shows the main components of an inductive power outlet 200 incorporating such an automatic alignment system 100. The inductive power outlet 200 is configured to provide power inductively to an inductive power receiver 300.

The inductive power receiver 300 includes a secondary inductor 320, such as a coil of litz wire or the like, typically connected to an electric load 340 and configured to provide power thereto. Although, for the sake of simplicity, various electrical elements have been omitted from the diagram, it will be appreciated that inductive transmission receivers may include additional elements such as rectification circuitry, feedback mechanisms and the like.

The inductive power outlet 200 includes a primary inductor 220, a driver 230 and an alignment system 100. The primary inductor 220 is conductively connected to the driving unit 230 which draws power from a power supply 240 and is operable to provide an oscillating driving voltage to the primary inductor. The driving electronics may include a switching unit for example an AC-AC converter or DC-AC converter such as an inverter or the like, selected so that a high frequency oscillating voltage output is generated.

The primary inductor 220 is selected such that it may inductively couple with a suitable secondary inductor 320 of an inductive receiver 300 placed within an extended target area 210 such that inductive power transfer may occur. Accordingly, the primary inductor 220 may be a coil of litz wire or the like, possibly of similar dimensions as the secondary inductor 320. The efficiency of the inductive coupling and energy transfer may be improved by matching the dimensions of the primary inductor 220 and the secondary inductor 320 achieving good alignment therebetween.

Efficiency Seeking

It is a particular feature of the alignment system 100 that it is operable to seek efficiency and thus to align the primary inductor 220 to a secondary inductor 320 placed anywhere within a target area 210. The alignment system 100 includes a proximity sensor 120 and a positioning mechanism 150.

The proximity sensor 130 may be configured to detect the presence of the inductive power receiver 300 and to communicate sensor signals to the processor 130 indicating the proximity of the primary inductor 220 to the position of highest efficiency. Examples of proximity sensors 130 may include voltage monitors, power monitors, current monitors and the like. Where an inductive communication channel, as described below, is provided, the efficiency of the power transfer may be monitored by determining the power of a feedback signal transmitted from the secondary inductor 320 to the primary inductor 220.

An inductive communication channel may be provided for transferring signals from the secondary inductive coil 320 to the primary inductive coil 220 concurrently with uninterrupted inductive power transfer from the primary inductive coil 220 to the secondary inductive coil 320. The communication channel may provide feedback signals to the driver 230. The inductive communication channel may include a transmission circuit wired to the secondary coil 320 and a receiving circuit wired to the primary coil 220.

The signal transmission circuit may include at least one electrical element, selected such that when it is connected to the secondary coil 320, the resonant frequency of the system increases. The transmission circuit is configured to selectively connect the electrical element to the secondary coil 320. Accordingly, the signal receiving circuit may include a voltage peak detector configured to detect large increases in the transmission voltage. In systems where the voltage transmission frequency is higher than the resonant frequency of the system, such large increases in transmission voltage may be caused by an increase in the resonant frequency thereby indicating that the electrical element has been connected to the secondary coil 320. Thus the transmission circuit may be used to send a signal pulse to the receiving circuit and a coded signal may be constructed from such pulses.

According to some embodiments, the transmission circuit may also include a modulator for modulating a bit-rate signal with the input signal. The electrical element may then be connected to the secondary inductive coil 320 according to the modulated signal. The receiving circuit may include a demodulator for demodulating the modulated signal. For example the voltage peak detector may be connected to a correlator for cross-correlating the amplitude of the primary voltage with the bit-rate signal thereby producing an output signal.

It is noted that other inductive communication channels may be alternatively be used. For example a transmission circuit may be configured to connect an ancillary load to the secondary inductor selectively to provide an amplitude modulated transmission voltage encoding a feedback signal.

Where such an inductive communication channel is provided, the feedback signal is highly dependent upon the resonant frequency of the system. Because the resonant frequency of the system is itself dependent upon the degree of alignment between the primary inductor 220 and the secondary inductor 320, the receiving circuit wired to the primary inductor 220 may itself serve as the proximity detector 120.

Actuation of the Alignment Mechanism

The positioning mechanism 150 may include a controller 130, at least one actuation mechanism 140, 160 and a mobile platform 180 to which the primary inductor 220 is mounted. The controller 130 is configured to receive sensing signals from the proximity sensor 120 and to send actuation signals so as to control the movement of the mobile platform 180 and thereby the primary inductor 220.

Typically, two actuation mechanisms 140, 160 are provided. A first actuation mechanism 140 is configured to move of the primary inductor 220 along a first path and a second actuation mechanism 160 for controlling movement of the primary inductor 220 along a second path. Thus the primary inductor 220 may be moved into any position within an area defined by the interaction of the two paths. Additional actuation mechanisms may be further provided in order to allow a greater range of movement perhaps over three dimensions.

The controller 130 may be configured to direct the primary inductor 220 into alignment with the secondary inductor 320 by sending actuation signals to each actuation mechanism 140, 160 selectively in response to the sensor signals so as to move the mobile platform 180.

X-Y Table

Figure 12:
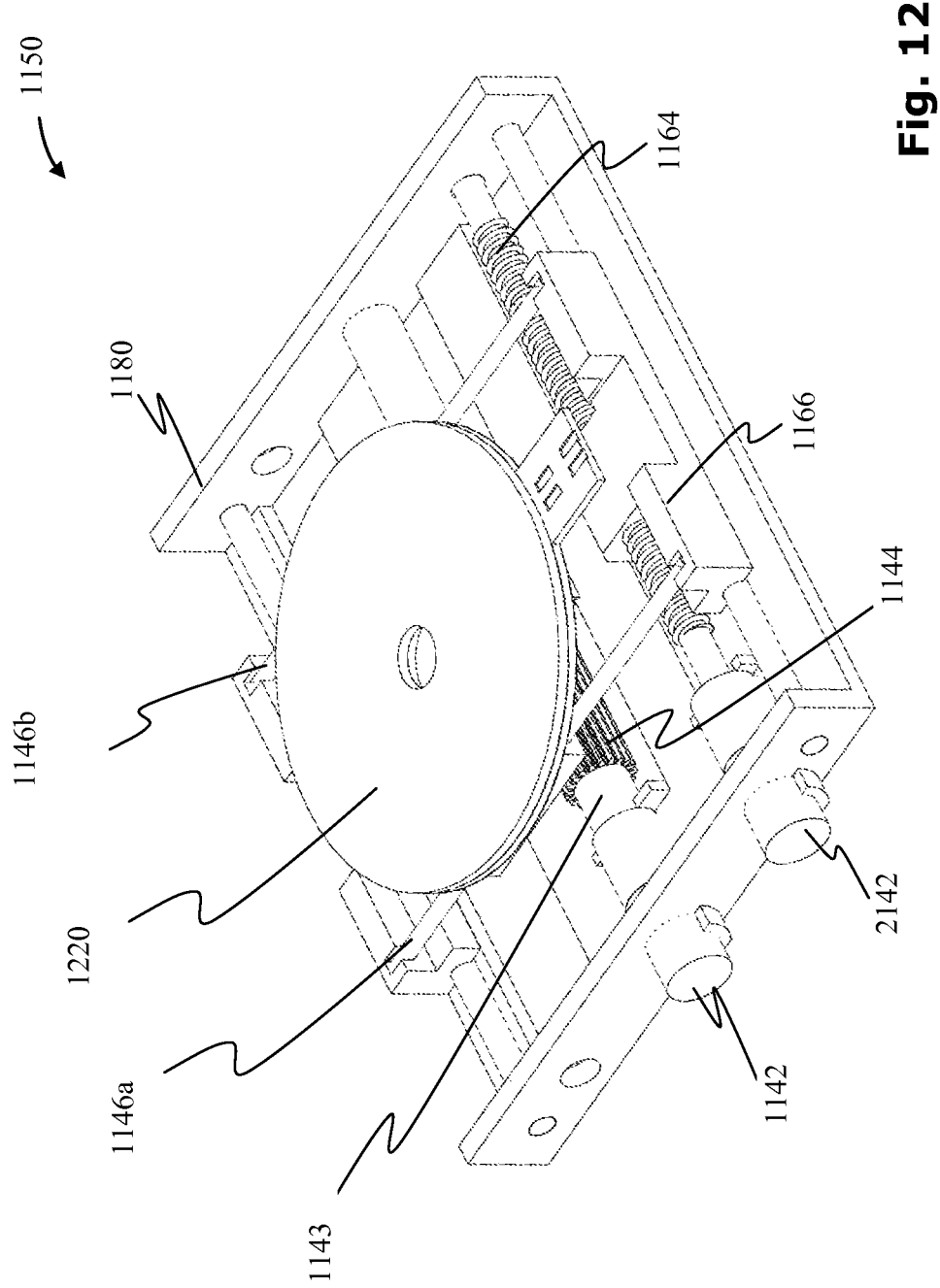
FIG. 12 is a schematic diagram of a possible positioning system for use in the automatic alignment system in which the primary inductor is coupled to an X-Y table.

By way of example, reference is now made to FIG. 12 showing a schematic representation of a possible positioning system 1150 in which the primary inductor 1220 is coupled to an X-Y table 1180. The X-Y table 1180 includes a first actuation mechanism 1140 and a second actuation mechanism 1160 configured to drive the secondary inductor 1220 along orthogonal paths defined by a first pair of tracks 1146a, 1146b and a second pair of tracks 1166a, 1166b respectively. The primary inductor 1220 is coupled to the first pair of tracks 1146a, 1146b which are themselves mounted upon a support platform 1168 coupled to the second pair of tracks 1166a, 1166b.

The first actuation mechanism 1140 of the example includes of a first actuator 1142, a pinion drive shaft 1144 and a rack 1148 upon which the secondary inductor 1220 is mounted. The second actuation mechanism 1160 of the example includes a second actuator 1162, a leadscrew shaft 1164, and a leadnut coupled to the support platform 1168.

The first actuator 1142 and the second actuator 1162 of the example are stepper motors operable to incrementally drive the first actuation mechanism and the second actuation mechanism respectively. As will be described in further detail below, it may be a feature of the positioning mechanism 1150 that the stepper motors 1142, 1162 are each operable to respond to a plurality of activation signals by stepping the primary inductor 1220 along increments having a plurality of sizes.

Curved Paths

Figure 13:
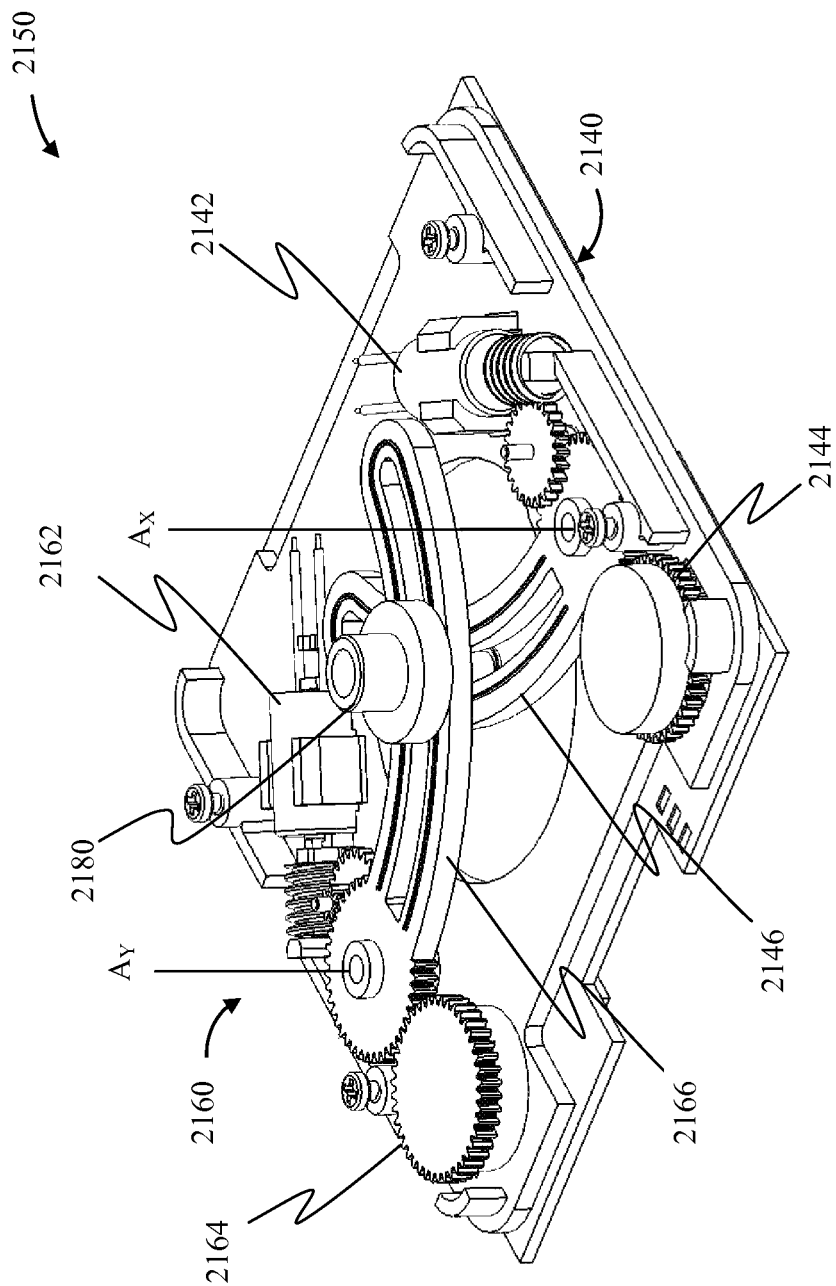
FIG. 13 is a schematic diagram of an alternative positioning system for use in the automatic alignment system.

Referring now to FIG. 13, a schematic diagram is presented of a second example using an alternative positioning system 2150. The alternative positioning system 2150 includes a first actuation mechanism 2140 and a second actuation mechanism 2160 configured to drive the secondary inductor 2220 along curved paths defined by a first curved track 2146 and a second curved track 2166 respectively.

The primary inductor 2220 is mounted to a coupling pin 2180 which couples the first curved track 2146 to the second curved track 2166. The first actuation mechanism 2140 comprises a first stepper motor actuator 2142 coupled to the first curved track 2146 via a first gear transmission 2144 and operable to rotate the first curved track about a first axis $A_x$. The second actuation mechanism 2160 comprises a second stepper motor actuator 2162 coupled to the second curved track 2166 via a second gear transmission 2164 and operable to rotate the second curved track about a second axis $A_y$. It will be appreciated that by providing actuation signals to the first actuator 2142 and the second actuator 2162 a controller (not shown) may position the primary inductor 1120 anywhere within a range defined by the movement of the curved tracks 2146, 2166.

The mechanical arrangements of the positioning mechanisms 1150, 2150 described hereinabove are configured such that the stepper motor actuators 1142, 1162, 2142, 2162 are positioned in proximity to one another on a common side of the device. Such an arrangement is noted for its convenience particularly for connecting the actuators to the control unit. Although only stepper motors are described in the examples above, it will be appreciated that other actuators may be preferred as suit requirements such as other motors, piezoelectric elements, solenoid actuators and the like.

Alignment Method

Figure 14:
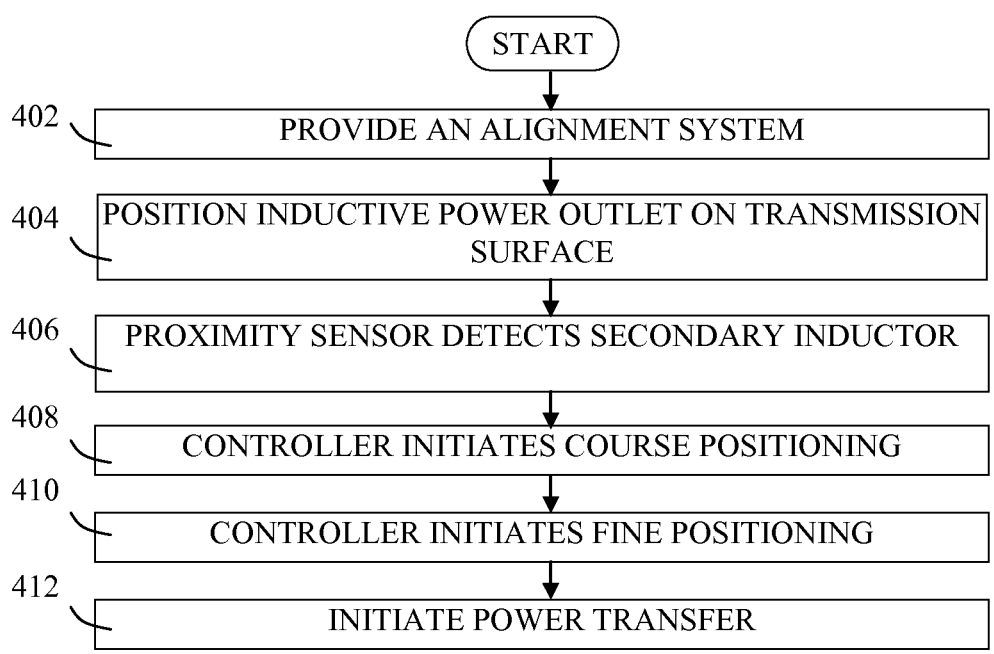
FIG. 14 is a flowchart showing the general steps of the alignment procedure performed by the positioning system.

Reference is now made to the flowchart of FIG. 14 showing the general steps of the alignment procedure for an inductive power transfer system using such a positioning system. The inductive power outlet is provided with an alignment system 402, an inductive power receiver is positioned upon a transmission surface of the inductive power outlet within the target region 404, the proximity sensor of the positioning system detects the secondary inductor 406, the controller initiates a course positioning procedure to position the primary inductor into the general locale of the secondary inductor 408, the controller may then initiate a fine positioning procedure to bring the primary inductor into alignment with the secondary inductor 410, once the primary inductor is aligned to the secondary inductor the primary inductor initiates inductive power transmission 412.

In order to enable the course positioning and fine positioning of the primary inductor, the positioning system may be operable at low and high resolutions. During course positioning, the controller sends low resolution activation signals to the actuation mechanisms instructing the actuators to shift the primary inductor by large increments. Similarly, for fine positioning, the controller sends high resolution activation signals to the actuation mechanisms instructing the actuators to shift the primary inductor by small increments. The processor of the controller is configured to select which activation signal to send to which activator according to the sensor signals received from the proximity sensor.

Figure 15A:
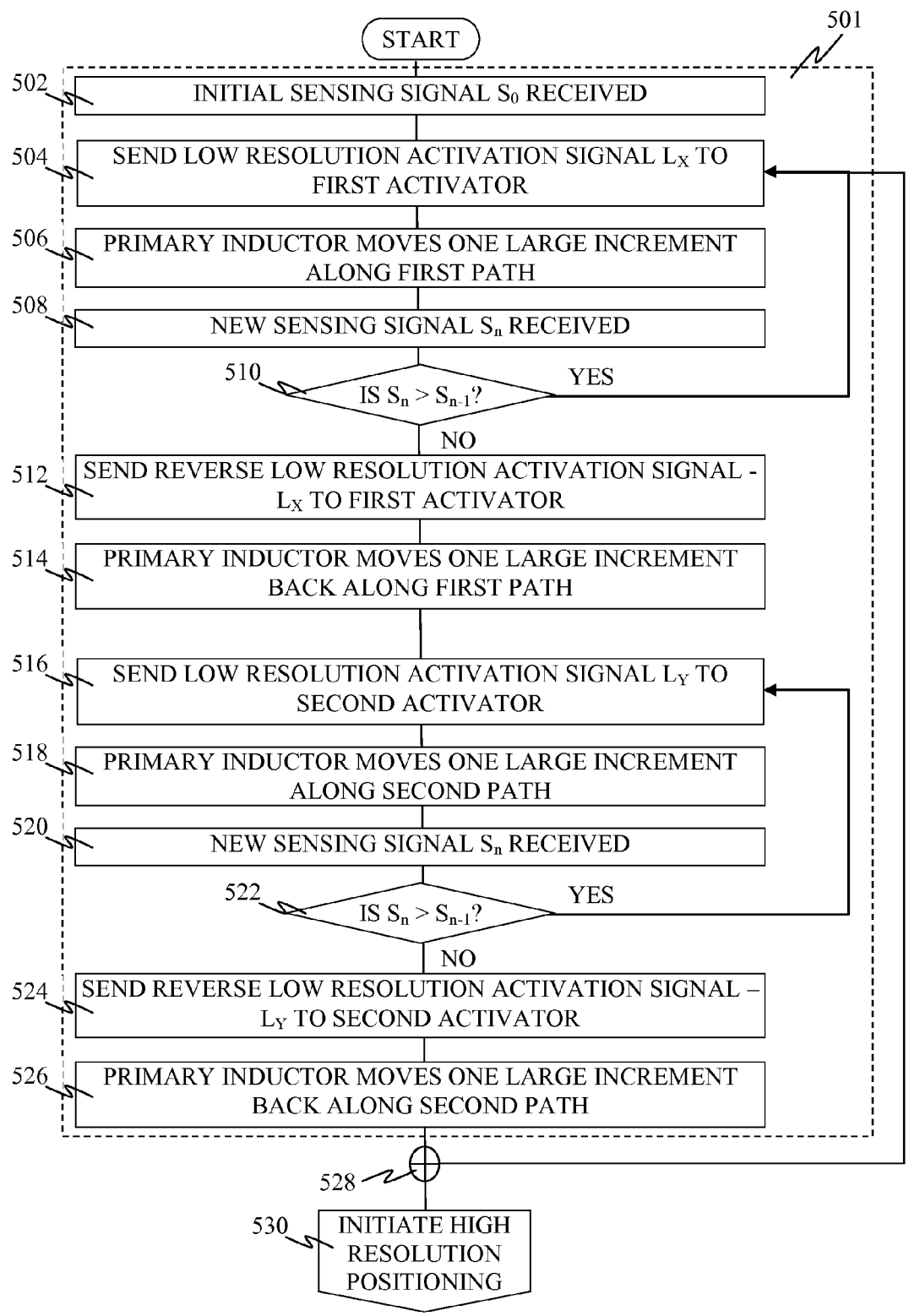
FIGS. 15A and 15B show a flowchart of possible methods for course positioning and fine positioning of the primary inductor respectively.
Figure 15B:
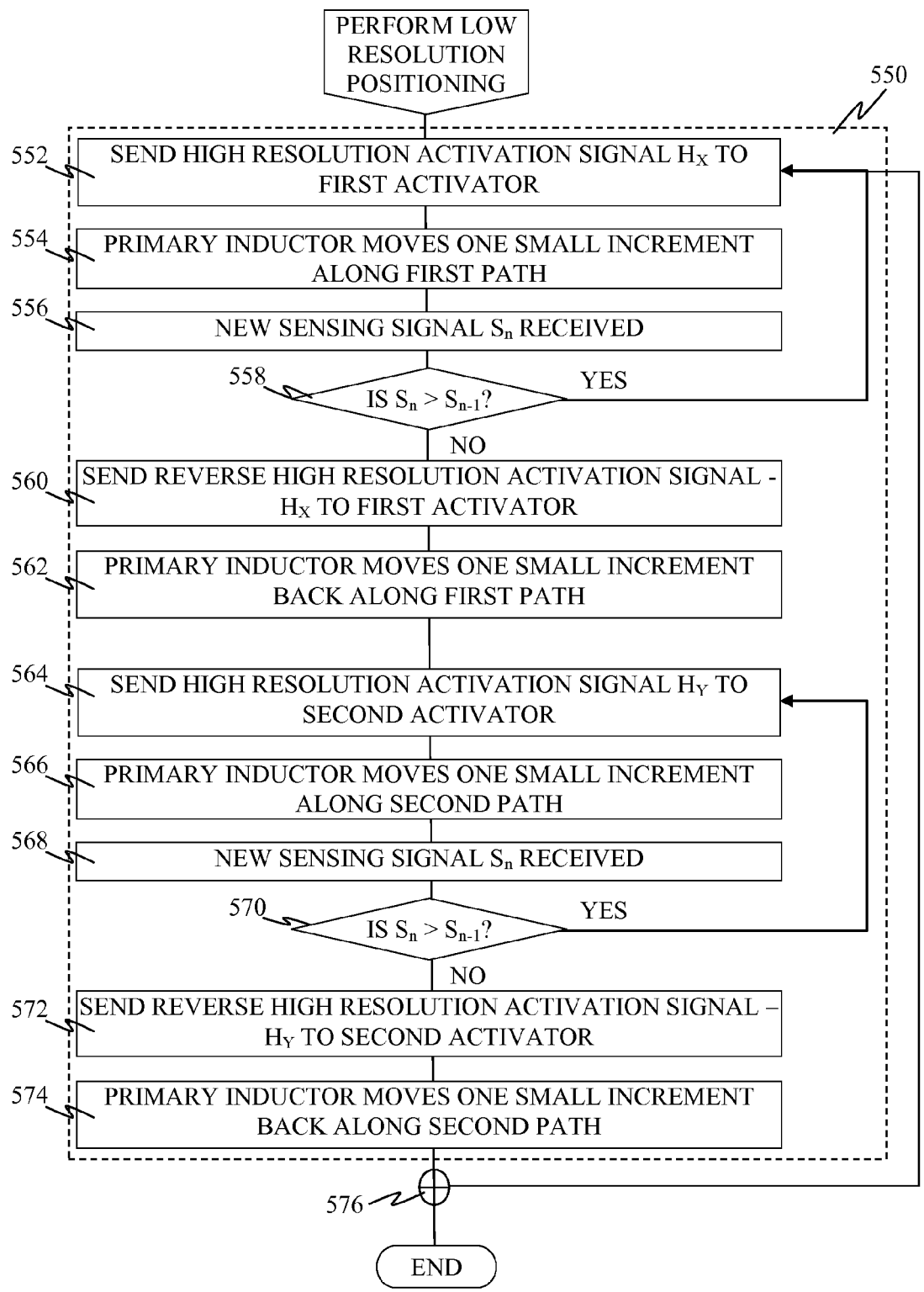

Reference is now made to the flowcharts of FIGS. 15a and 15b representing possible methods for controlling course positioning 501 and fine positioning 550 of the primary inductor respectively. With particular reference to FIG. 15A, when a secondary inductor is placed upon the target area the course positioning phase may follow the following steps: the proximity sensor senses an initial sensing signal $S_0$ and communicates this to the controller 502, a low resolution actuation signal $L_x$ is sent to the first actuator 504, the first actuator moves the primary inductor forwards by one large increment along the first path 506, the proximity sensor senses a new sensing signal $S_1$ and communicates this to the controller 508; the processor compares the $S_1$ to $S_2$ 510, if $S_1 > S_0$, indicating that the primary inductor is closer to alignment with the secondary inductor than it was initially then steps 504 to 510 are repeated, when $S_n < S_{n-1}$, indicating that the primary inductor is further from alignment with the secondary inductor than it was previously then a reverse low resolution actuation signal $-L_x$ is sent to the first actuator 512, the first actuator moves the primary inductor backwards by one large increment along the first path 514; a low resolution actuation signal $L_y$ is sent to the second actuator 516; the second actuator moves the primary inductor forwards by one large increment along the second path 518; the proximity sensor senses a new sensing signal $S_n$ and communicates this to the controller 520; the processor compares the $S_n$ to $S_{n-1}$ 522, steps 516 to 522 are repeated until the new sensing signal indicates that the primary inductor is further from alignment with the secondary inductor than it was previously, when $S_n < S_{n-1}$, a reverse low resolution actuation signal $-L_y$ is sent to the second actuator 524, the second actuator moves the primary inductor backwards by one large increment along the second path 526, optionally the course positioning phase may be repeated a plurality of times until insignificant improvement in alignment is achieved with each iteration 528; once course positioning is complete high resolution positioning may be initiated 530.

With particular reference now to FIG. 15b, showing the steps of the high resolution positioning phase 550, following the course positioning phase 500: a high resolution actuation signal $H_x$ is sent to the first actuator 552, the first actuator moves the primary inductor forwards by one small increment along the first path 554, the proximity sensor senses a new sensing signal $S_n$ and communicates this to the controller 556; the processor compares the $S_n$ to $S_{n-1}$ 558, steps 552 to 558 are repeated until the new sensing signal indicates that the primary inductor is further from alignment with the secondary inductor than it was previously, when $S_n < S_{n-1}$, a reverse high resolution actuation signal $-H_x$ is sent to the second actuator 560, the first actuator moves the primary inductor backwards by one small increment along the first path 562; a high resolution actuation signal $H_y$ is sent to the second actuator 564; the second actuator moves the primary inductor forwards by one small increment along the second path 566; the proximity sensor senses a new sensing signal Sn and communicates this to the controller 568; the processor compares the $S_n$ to $S_{n-1}$ 570, steps 564 to 570 are repeated until the new sensing signal indicates that the primary inductor is further from alignment with the secondary inductor than it was previously, when $S_n < S_{n-1}$, a reverse high resolution actuation signal $-H_Y$ is sent to the second actuator 572, the second actuator moves the primary inductor backwards by one small increment along the second path 574, optionally the fine positioning phase may be repeated a plurality of times until insignificant improvement in alignment is achieved with each iteration 576.

Alternative positioning algorithms, as may occur to the skilled practitioner, may be alternatively used to suit requirements of the system. For example, accurate positioning may be achieved along a given path by the actuator stepping the primary inductor along the path by full increments for as long the sensing signal rises; once the sensing signal drops, the actuator may step the primary inductor backwards along the path by a half increment; according to the new sensing signal, the actuator may then step the primary inductor backwards or forwards a quarter increment; the process may then be repeated using eighth sized increments, sixteenth sized increments and so on as required.

Auxiliary Coils

Still other inductive power transfer systems may extend the range by the inclusion of an auxiliary coil arrangement 800. Referring back to FIG. 1, the driver 230 of the inductive power transmitter 200 is operable to provide a variable electric potential across the primary inductor 220, typically a primary coil, thereby producing an oscillating magnetic field in the vicinity of the primary inductor 220. When the secondary inductor 320, typically a secondary coil, of an inductive power receiver 300 is placed within the oscillating magnetic field produced by the primary inductor 220, an oscillating induced voltage is generated.

The power reception range over which the inductive power receiver 300 may receive power from the inductive power transmitter 200 may depend upon the strength and extension of the oscillating magnetic field. It has surprisingly been found that the efficiency of power transfer from a primary inductor to a secondary inductor not aligned thereto may be increased by introducing one or more auxiliary coils between the primary inductor 220 and the secondary inductor 320. Thus the power reception range of the inductive power transmitter 200 may be extended.

Auxiliary Coil Modes

Figure 16A:
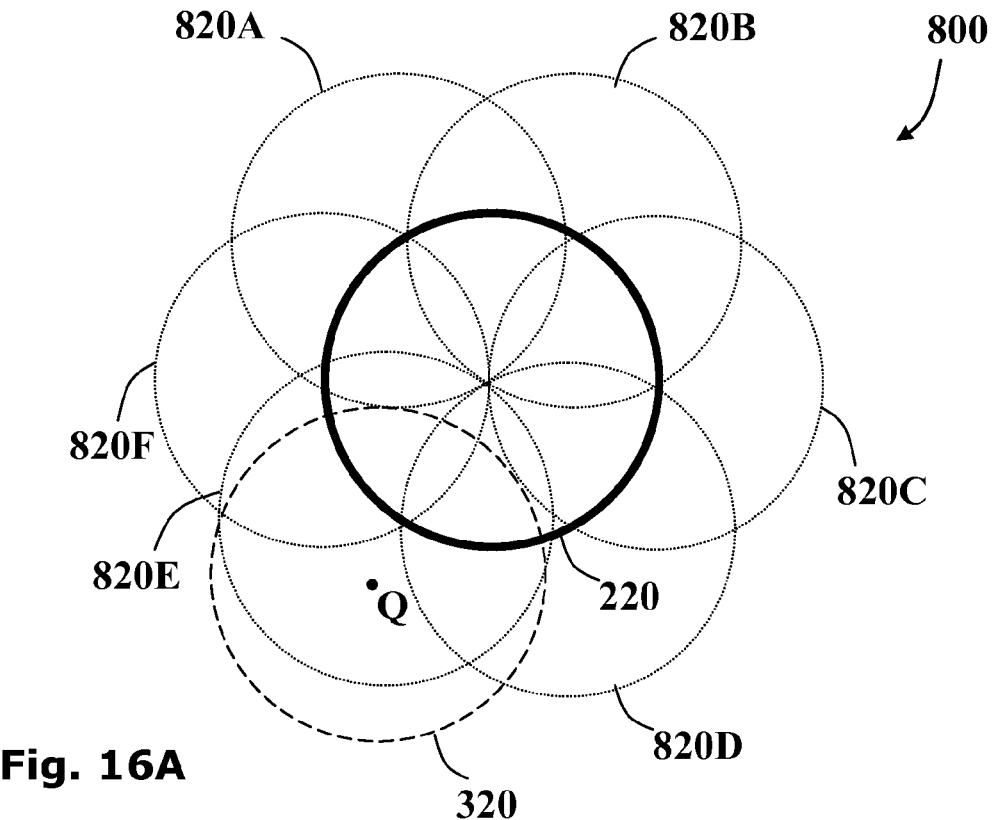
FIG. 16A shows one possible geometry of a possible auxiliary coil arrangement for use in an inductive power transfer system.

Referring to FIG. 16A, representing a possible auxiliary coil arrangement 800. The auxiliary coil arrangement 800 includes an array of six auxiliary coils 820a-f arranged around the primary coil 220. A hexagonal array is described with the axis of each auxiliary coil 820A-F shifted from the axis of the primary coil 220 and from each other by a radius length. It will be appreciated that in other systems, alternative geometrical arrangements may be preferred to suit requirements. The auxiliary coils 820 may be configured to operate in one or more of a plurality of modes as described below. Possible auxiliary coil modes include: (i) conductor mode, (ii) repeater mode, (iii) transmission mode or (iv) stand-by mode.

Figure 16B:
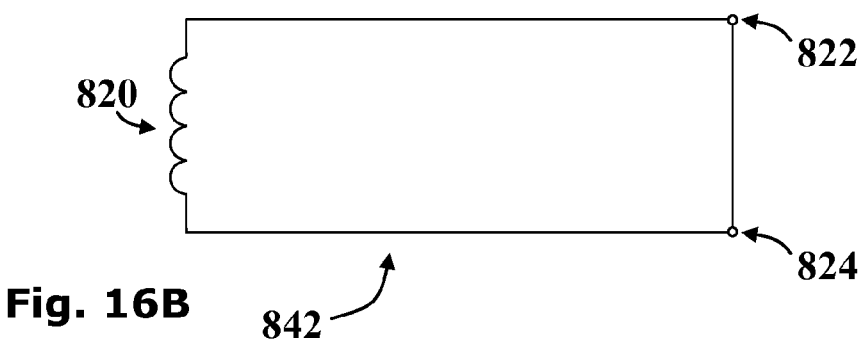
FIG. 16B shows a possible auxiliary coil circuit configured in conductor mode.
Figure 16C:
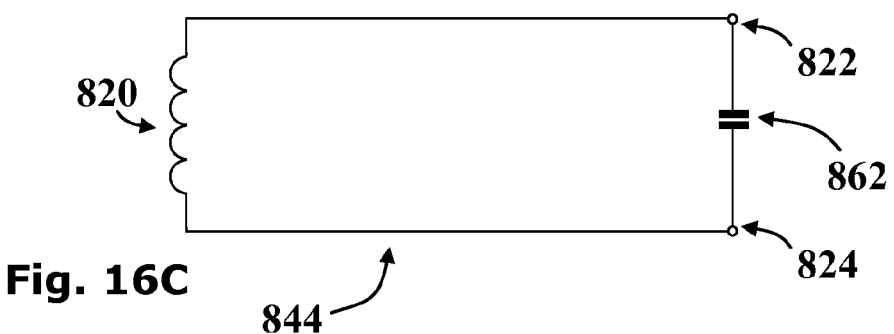
FIG. 16C shows a possible auxiliary coil circuit configured in repeater mode.
Figure 16D:
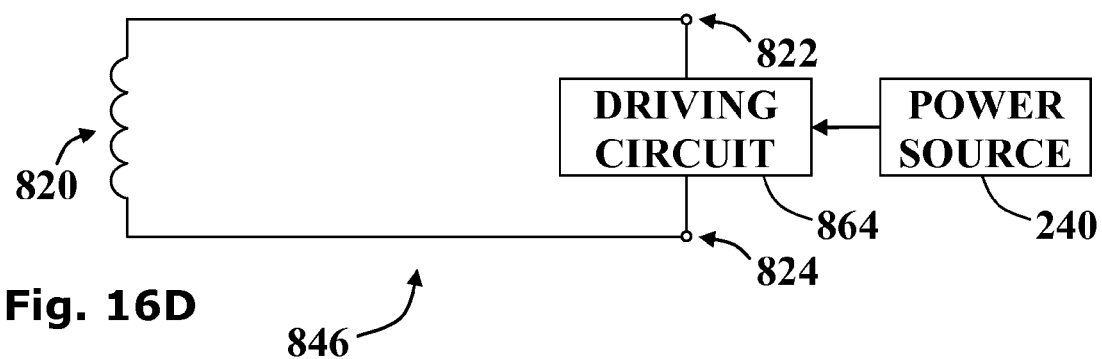
FIG. 16D shows a possible auxiliary coil circuit configured in transmission mode.

The circuit diagram of FIG. 16B shows a possible auxiliary coil circuit 842 configured in conductor mode. The circuit diagram of FIG. 16C shows a possible auxiliary coil circuit 844 configured in repeater mode. The circuit diagram of FIG. 16D shows a possible auxiliary coil circuit 846 configured in transmission mode.

Conductor Mode

With particular reference now to FIG. 16B, in conductor mode, the terminals 822, 824 of the auxiliary coil 820 are conductively connected, possibly via a resistor (not shown). In this configuration, the auxiliary coil behaves as a sheet conductor introduced. It has surprisingly been found that when a secondary inductor 320 is laterally shifted from the primary inductor 220, the efficiency of energy transfer thereto increases when a sheet conductor is introduced to cover the 'exposed' region of the primary inductor. It is suggested that this unexpected phenomenon may be related to changes in the natural resonant frequency of the system in the presence of the conductor or a consequence of the flux lines being guided more efficiently to the secondary inductor 320.

In consequence of the above described phenomenon, inductive power transfer between a primary inductor 220 and a non-aligned secondary inductor 320 may be improved by operating at least a portion of the auxiliary coils 820 covering the exposed section of the primary inductor 220 in conductor mode. Referring back to FIG. 16A, for example, if a secondary inductor 320 was centered at point Q, say, efficiency of energy transfer may be improved by operating auxiliary coils 820A-C in conducting mode.

Repeater Mode

With particular reference now to FIG. 16C, in repeater mode, the terminals 822, 824 of the auxiliary coil 820 are connected via a capacitor 862. It is noted that in repeater mode, a secondary voltage may be induced in the auxiliary coil itself, which in turn produces its own oscillating magnetic field having the same frequency as the primary inductor. It has been found that by introducing at least one auxiliary coil in repeater mode between a secondary inductor 320 and a primary inductor 220, the efficiency of energy transfer may be increased at larger ranges. Referring back again to FIG. 8A, for example, if a secondary inductor 320 was centered at point Q, say, efficiency of energy transfer may be improved by operating auxiliary coil 820E in repeater mode.

Furthermore, by using one or more auxiliary coils in repeater mode, the power reception range may be extended vertically above the primary inductor. Indeed, a series of repeaters may be used as stepping stones to extend the range of the primary inductor 220 still further.

It is noted that in conductor mode and repeater mode, the auxiliary coils need not be connected to any power supply and power is drawn by the secondary inductor 320 from the primary inductor alone.

Transmission Mode

With particular reference now to FIG. 16D, in transmission mode, the terminals 822, 824 of the auxiliary coil 820 are connected to a driving circuit 864 wired to a power source 240 and operable to produce an oscillating voltage across the auxiliary coil. Accordingly, in transmission mode, the auxiliary coil 820 may serve as an additional primary coil transmitting power to the secondary inductor 320.

The driving circuit 864 may be operable to drive the auxiliary coil 820 independently from the primary inductor 220. Thus the driving voltage supplied to the auxiliary coil 820 may be phase shifted from that supplied to the primary inductor 220. The phase difference between the auxiliary coil 820 and the primary inductor 220 may be selected according to the placement of the secondary coil 320.

Coordination between the primary inductor 220 and one auxiliary coil 820 is now illustrated with reference to FIG. 16E, which schematically shows possible locations A, B of a secondary coil 320 relative to a primary inductor 220 and one auxiliary coil 820. The auxiliary coil 820 is spaced at a distance of one radius from the primary inductor 220.

When the secondary inductor 320 is aligned with the primary inductor 220, the driving circuit 864 is not activated and the auxiliary coil 820 remains in stand-by mode. Similarly when the secondary inductor 320 is aligned with the auxiliary coil 820, the primary inductor 220 may be disconnected and the driving circuit 864 activated so that the auxiliary coil 820 serves as the only transmitting primary coil.

When the secondary inductor 320 is located at position A, half way between the primary inductor 220 and the auxiliary coil 820, it has surprisingly be found that energy transfer to the secondary inductor may be improved by operating the auxiliary coil 820 in phase with the primary inductor 220. It is suggested that the currents flowing in opposing directions in each of the overlapping sections 880 of the primary inductor 220 and the auxiliary coil 820 form a parasitic coil thereby closing the lines of flux. Consequently the induced voltage in the secondary inductor 320 is increased.

When the secondary inductor 320 is located at position B, such that it overlaps only with the auxiliary coil 820, it has surprisingly been found that energy transfer to the secondary inductor 220 is significantly improved by driving the auxiliary coil 820 with a phase shift of 180 degrees such that the driving voltage in the primary inductor 220 and the auxiliary coil 820 are in antiphase. It is suggested that the additive currents flowing in the overlapping section 880 of the primary inductor 220 and the auxiliary coil 820 produce a stronger oscillating magnetic field and thus a larger induced voltage in the secondary inductor 320.

Figure 16E:
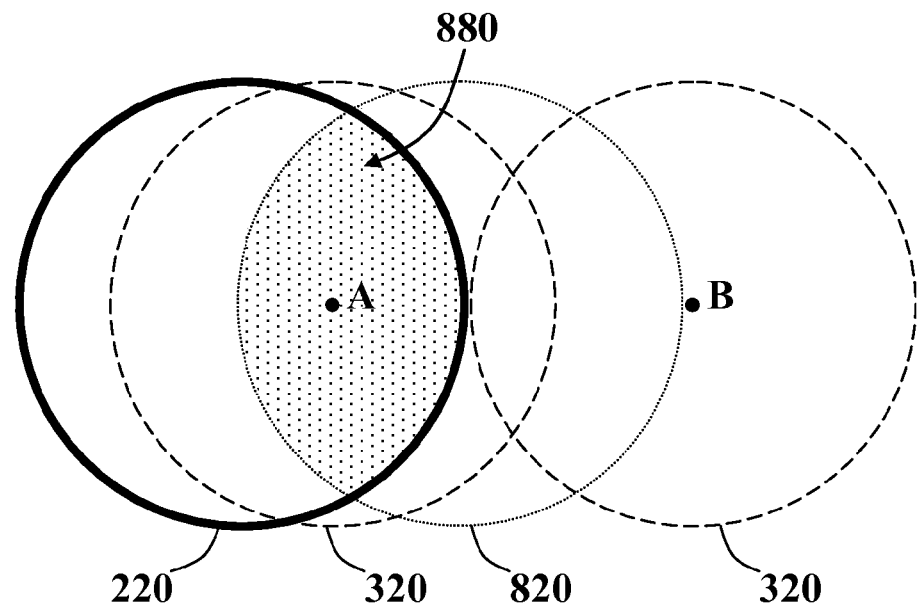
FIG. 16E schematically shows possible locations of a secondary coil relative to a primary inductor and one auxiliary coil.

For ease of explanation, only two coordinated coils 220, 820 are described in relation to FIG. 16E, nevertheless, it will be appreciated that such a system may be readily extended to multiple coil arrangements such as triangular, quadrangular, hexagonal geometries or the like.

Plurality of Modes

Figure 16F:
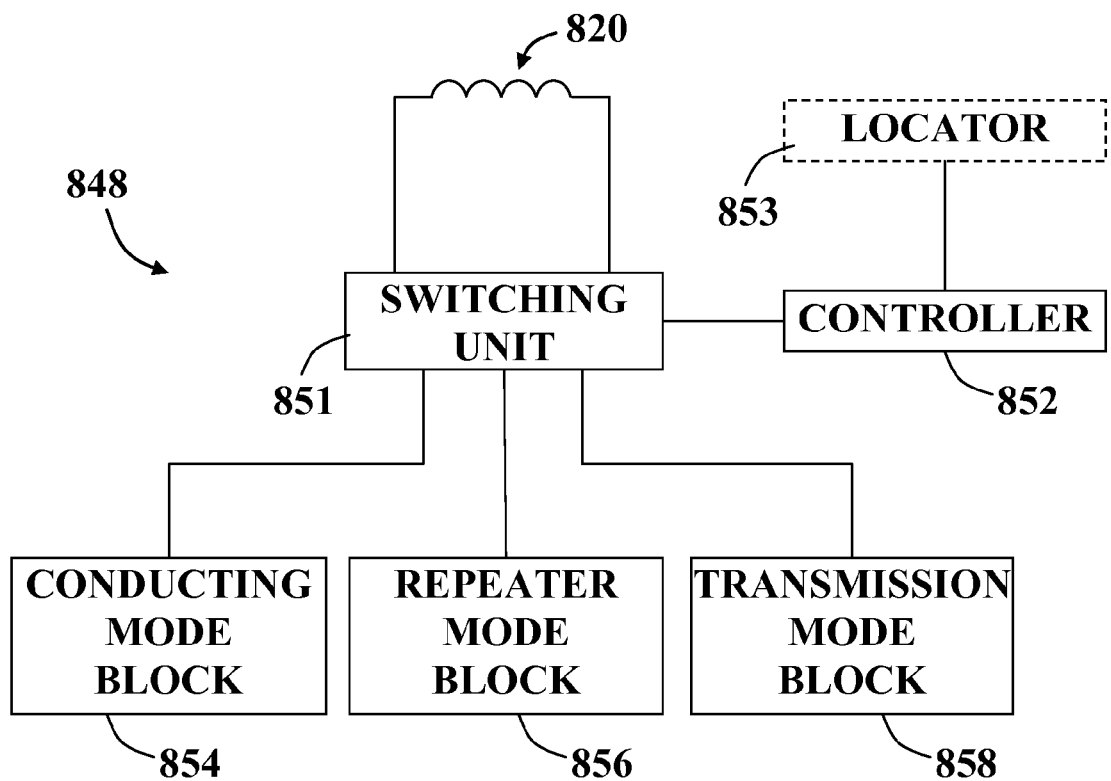
FIG. 16F shows the main elements of a possible auxiliary coil circuit configured to switch an auxiliary coil 820 between multiple modes.

Auxiliary coils may be configured to operate in at least one of the above modes. Where required, auxiliary coils may be configured to operate selectively in more than one mode. The block diagram of FIG. 16F shows the main elements of a possible auxiliary coil circuit 848 configured to switch an auxiliary coil 820 between multiple modes.

The auxiliary coil circuit 848 includes at least one auxiliary coil 820, at least one controller 852, a conducting mode block 854, a repeater mode block 856, a transmission mode block 858 and at least one switching unit 851. The controller is operable to instruct the switching unit 851 to selectively connect the auxiliary coil to the conducting mode block 854, the repeater mode block 856 or the transmission mode block 858.

The conducting mode block 854 may include a circuit such as shown in FIG. 16B for example, perhaps including an additional resistive element. The repeater mode block 856 may include a circuit such as shown in FIG. 16C for example. The transmission mode block 858 may include a circuit such as shown in FIG. 16D for example.

Where the location of the secondary coil 320 is known, the controller 852 may select the operational mode for at least one auxiliary coil 820 according to the location of the secondary inductor. Optionally, the auxiliary coil circuit 848 may further include a secondary inductor locator 853 such as volume sensors, magnetic sensors, or the like. The locator 853 is provided to communicate to the controller the position of a secondary inductor 320.

To illustrate a possible use of the auxiliary coil arrangement having multiple auxiliary coils, reference is again made to FIG. 16A. The auxiliary coils 820A-F may be connected to a common controller such that their operational modes are coordinated. Accordingly, when the secondary inductor 320 is located centered at point Q, for example, auxiliary coils 820A-C may be operated in conducting mode and auxiliary coils 820D-F may be operated in repeater mode. Alternatively, auxiliary coil 820e may be operated in transmission mode with its driving voltage in antiphase with the driving voltage of the primary inductor 220. Other mode combinations may be used, as required, and may be selected in accordance with the location of the secondary inductor 320.

It is noted that such an auxiliary coil arrangement may improve the efficiency of energy transfer to a secondary inductor 320 using a primary inductor 220 having a constant operating frequency.

A method is therefore taught herein for selecting the appropriate operational mode for the auxiliary coils. The method may include: obtaining a primary inductor, obtaining an auxiliary coil arrangement; detecting the location of a secondary inductor in relation to a primary inductor; selecting an operational mode for at least one auxiliary coil from: conducting mode, repeater mode, transmission mode or the like, operating at least one auxiliary coil with the selected operational mode. Where transmission mode is selected, the method may further include selecting a phase shift between transmission frequency of the primary inductor and the auxiliary coil.

Constant Operating Frequency

Figure 17A:
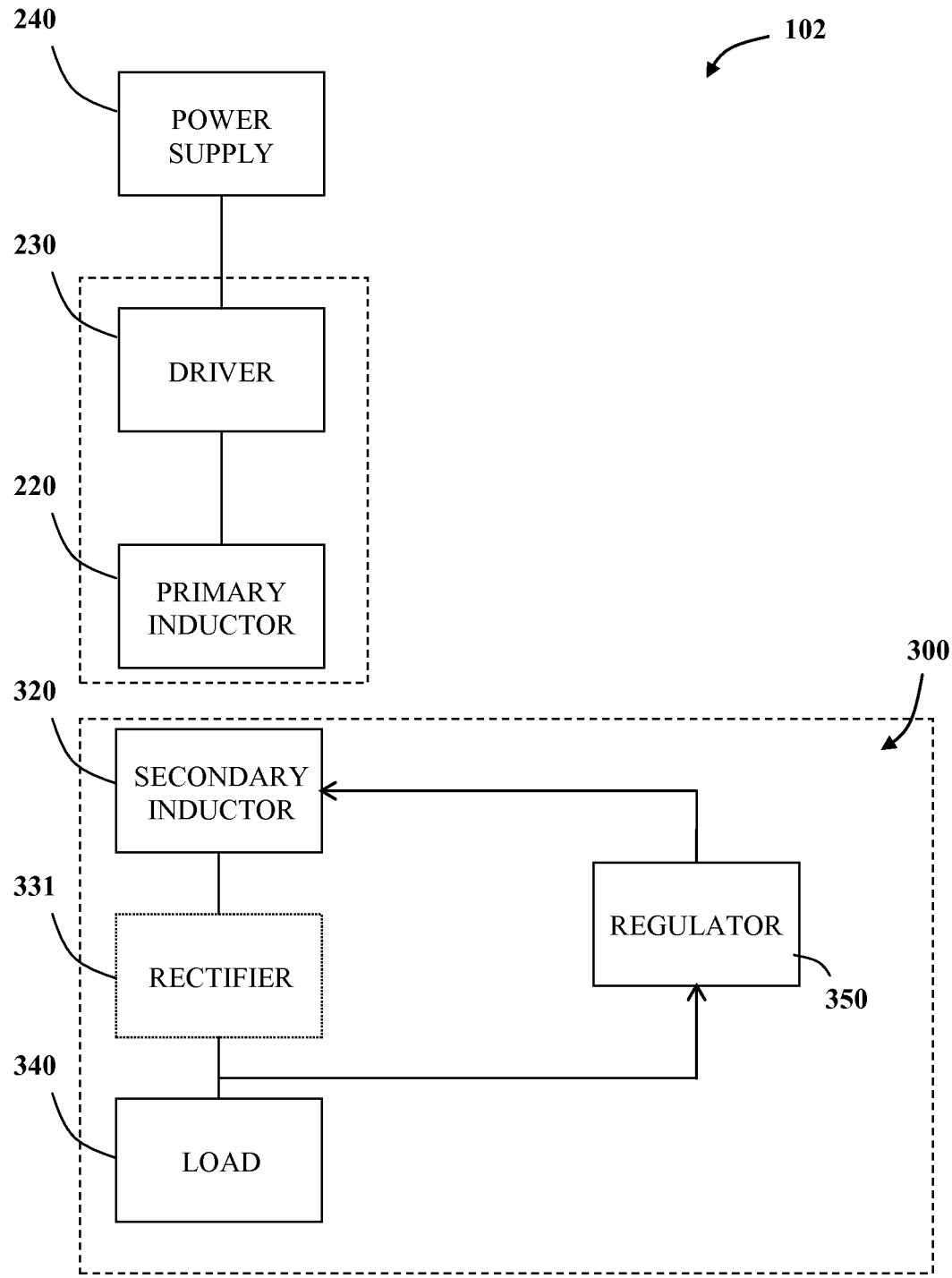
FIGS. 17A and 17B are block diagrams showing the main components of two embodiments of inductive power transmission systems including a receiver-side regulator.

Referring now to FIG. 17A, a block diagram is shown representing the main components of an inductive power transmission system 102. It is a particular feature that the regulation of power transfer is controlled, at least in part, by a regulator 350 in the inductive power receiver 300.

The inductive power outlet 200 includes a primary inductor 220, wired to a power supply 240 via a driver 230. The driver 230 typically includes electronic components, such as a switching unit, an inverter or the like, for providing an oscillating electrical potential to the primary inductor 220. The oscillating electrical potential across the primary inductor 220 produces an oscillating magnetic field in its vicinity.

The inductive power receiver 300 includes a secondary inductor 320 wired to an electric load 340, typically via a rectifier 331. The secondary inductor 320 is configured such that, when placed in the oscillating magnetic field of an active primary inductor 220, a secondary voltage is induced across the secondary inductor 320. The secondary voltage may be used to power the electric load 340. It is noted that an induced secondary voltage across the secondary inductor 320 produces an alternating current (AC). Where the electric load 340 requires direct current (DC), such as for charging electrochemical cells, the rectifier 331 is provided to convert AC to DC. Where AC output is required, such as in the inductive power adaptor 1300c used for providing a mains-type output, an inverter, an AC-AC converter or the like (not shown) may be further provided.

The receiver-side regulator 350 is configured to directly monitor the output voltage produced by the secondary inductor 320 and to compare the monitored output value with the operating voltage required by the electric load 340. The regulator 350 is further configured to bring the monitored output voltage closer to the required operating voltage of the electric load 340 by adjusting the resonant frequency of the inductive transmission system 102. Optionally the regulator 350 may be further configured to monitor additional operating parameters, such as temperature, current and the like.

Figure 17B:
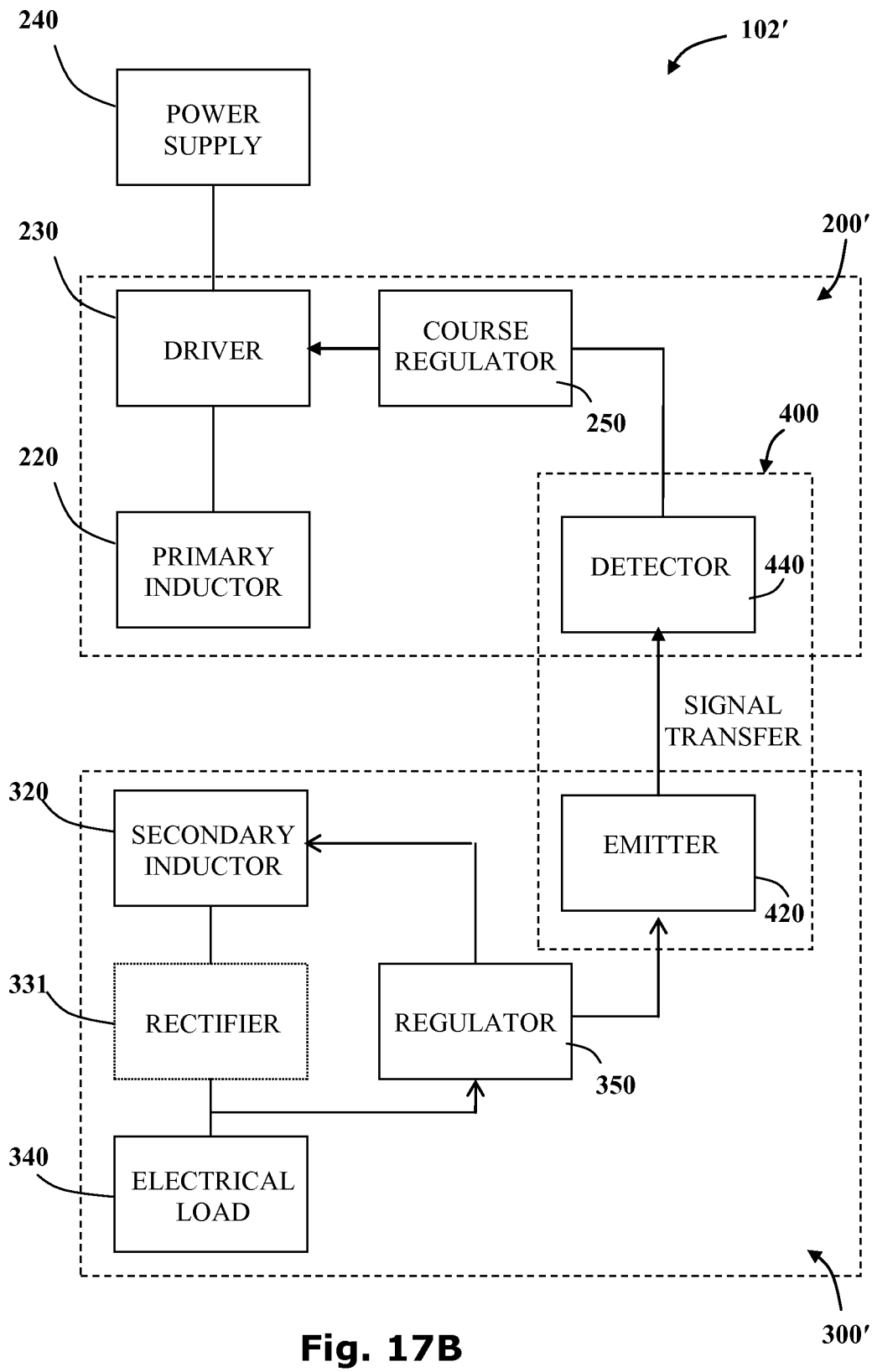

Referring now to FIG. 17B, in selected embodiments of the inductive power transfer system 102', a signal transfer system 400 is provided for passing signals between the inductive power receiver 300' and the inductive power outlet 200'. The signal transfer system 400 includes a signal emitter 420, associated with the inductive power receiver 300' and a signal detector 440, associated with the inductive power outlet 200'. Various signal transfer systems may be used such as combinations of optical, inductive, ultrasonic signal emitters or the like and their associated detectors as well as coil-to-coil signal transmission systems, such as described in the applicant's co-pending United States patent applications, U.S. application Ser. No. 12/497,088 and U.S. Ser. No. 563/12,544, incorporated herein by reference.

The receiver-side regulator 350 may utilize the signal transfer system 400 to communicate operating parameters to the inductive power transmitter 200'. A transmitter-side regulator 250 may be provided for receiving feedback signals from the signal detector 440 and to adjust the driving voltage to the primary inductor 220 accordingly. Typically the receiver-side regulator 350 may perform ongoing fine regulation without communicating any signals to the transmitter-side regulator 250 at all, with the transmitter-side regulator 250 being principally used for course adjustment.

Furthermore, the signal transfer system may additionally be used to communicate other signals for a variety of functions such as inter alia, confirming the presence of a power receiver 300', communicating an identification signal or for communicating required power transmission parameters. The latter being particularly useful in systems adapted to work at multiple power levels.

Figure 18:
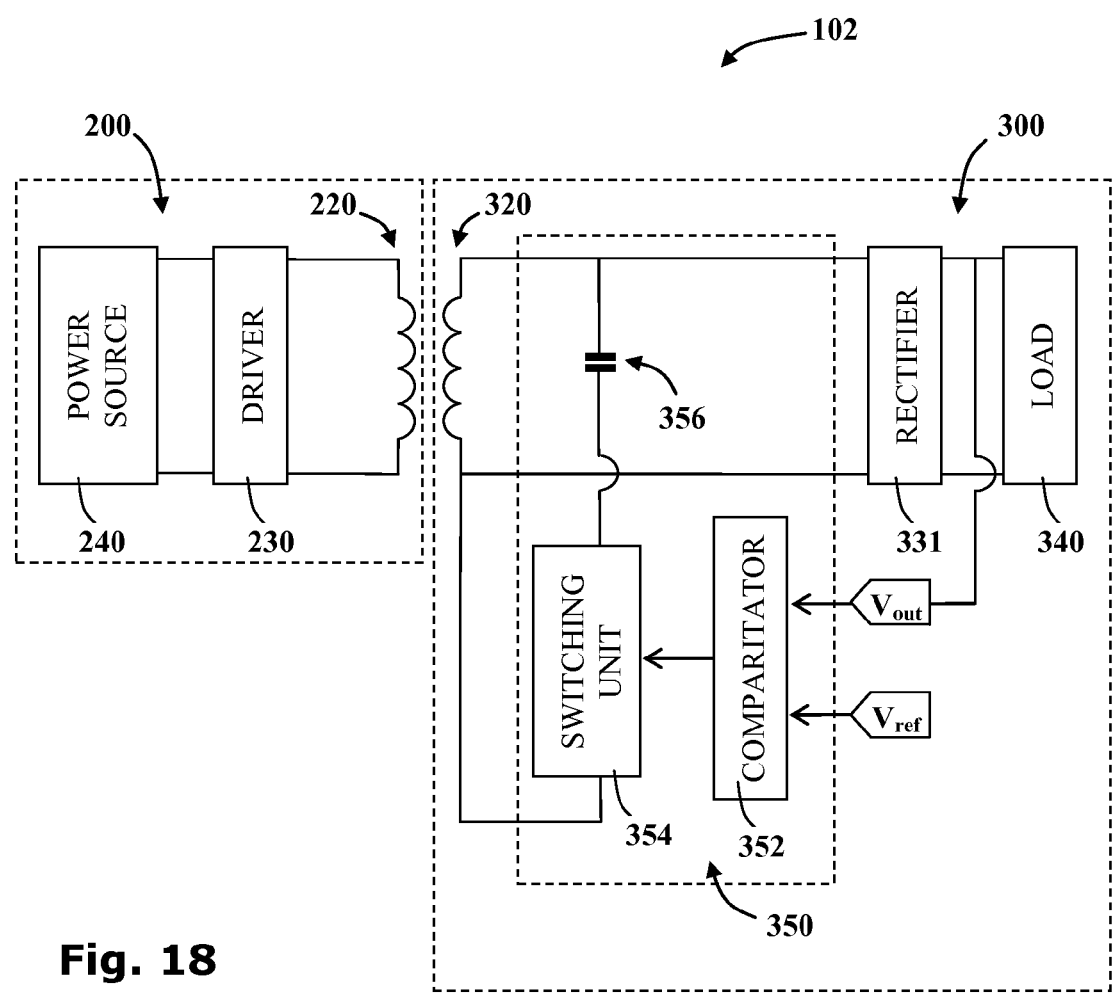
FIG. 18 is a schematic block diagram of the main electrical components of the inductive power transmission system including a resonance-altering component which may be introduced into the power reception circuit.

Reference is now made to FIG. 18 showing a schematic block diagram of the main electrical components of a power reception circuit of the inductive power transmission system 102. The inductive power transmission system 102 includes an inductive power transmitter 200 and an inductive power receiver 300. Power is transferred inductively from a primary inductor 220 associated with the inductive power transmitter 200 to a secondary inductor 320 associated with the inductive power receiver 300. The voltage induced in the secondary inductor 320 is rectified by a rectifier 331 producing an output voltage $V_{out}$ which is provided to an electric load 340.

It is particularly noted that a receiver-side regulator 350 is provided to control the inductive power transmission. The receiver-side regulator 350 includes a comparitator 352, a switching unit 354 and a resonance-altering component 356. The comparator 352 is configured to compare the monitored output voltage $V_{out}$ with a reference voltage $V_{ref}$ having a value indicating the required operating voltage of the electrical load. The switching unit 354 is typically configured to connect the resonance-altering component 356 to the power reception circuit when the difference between the monitored output voltage $V_{out}$ and the reference voltage $V_{ref}$ exceeds a threshold value.

The resonance-altering component 356 is selected such that when it is introduced into the power reception circuit the natural resonant frequency of the inductive power transfer system 102 is altered. One example of such a resonance-altering component 356 is a capacitor, which may be selectively connected to the reception circuit in parallel with the secondary inductor 220 to increase the natural resonant frequency of the inductive power transfer system 102. Other resonance altering components 356 (not shown) may include capacitors selectively connected in series with the secondary inductor 220 to reduce the natural resonant frequency, ancillary inductors connected to the secondary inductor 220 to increase the natural resonant frequency and the like. In certain embodiments a plurality of resonance-altering components 356 may be used in combination.

Figure 19:
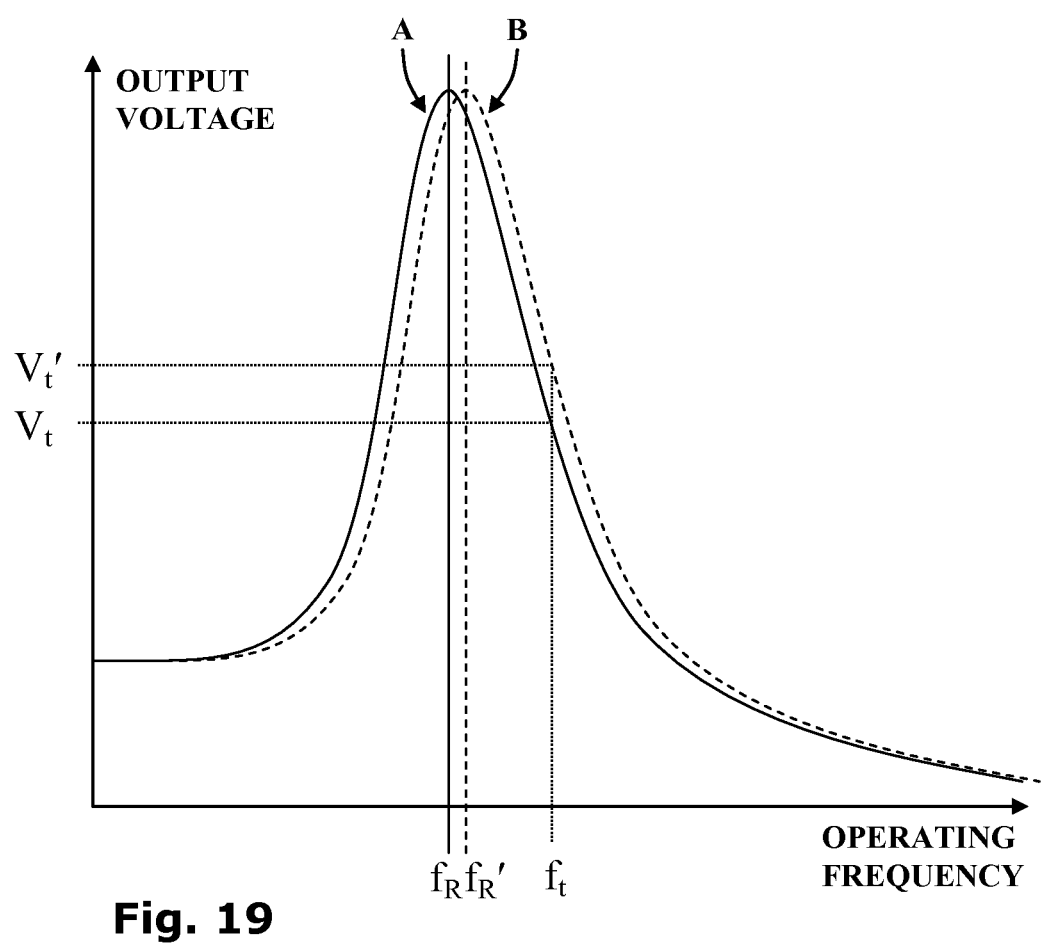
FIG. 19 is a graph showing how the output voltage of the secondary inductor of the exemplary embodiment varies with transmission frequency with and without the resonance-altering component connected.

FIG. 19 is a graph showing how the output voltage of the secondary inductor of the exemplary embodiment varies with operating frequency. The output voltage peaks when the operating frequency is equal to the resonant frequency $f_R$, $f_R'$ of the system. The full line A represents the voltage profile for the reception circuit with no resonance-altering component connected. The dashed line B represents the voltage profile for the reception circuit with a resonance-altering component connected such that the resonant frequency of the system increases from $f_R$ to $f_R'$. Such an increase may be effected, for example, by connecting a capacitor in parallel with the secondary inductor 320, as shown in FIG. 18.

In contradistinction to prior art systems which use resonant altering components to actively seek resonance, it is a particular feature of these embodiments that the transmission frequency $f_t$ is different from the resonant frequency $f_R$ of the system. It is noted that, for a transmission frequency $f_t$ above the resonant frequency $f_R$ of the system, the output voltage $V_t$ may be increased by increasing the resonant frequency of the system. Thus, if a resonant increasing element, such as the parallel capacitor 356 (FIG. 18), is introduced into the reception circuit, an output voltage at a certain value $V_t$ may rise to a higher value $V_t'$. A receiver-side regulator may therefore be configured to connect the resonant increasing element whenever the monitored output voltage $V_{out}$ drops below the required operating voltage $V_{req}$.

Further embodiments may include elements for reducing the output voltage $V_{out}$ if it rises above the required operating voltage $V_{req}$. Such voltage reducing elements may include resonance decreasing elements or alternatively switching units for intermittently disconnecting the load from output voltage altogether.

Embodiments described hereinabove relate to inductive power transmission systems which operate at a transmission frequency $f_R$ higher than the resonant frequency $f_t$ of the system. It will be appreciated that other embodiments may operate at transmission frequencies lower than the resonant frequency $f_t$ of the system. Where the operating frequency is lower than the resonant frequency $f_R$, the regulator may be configured to introduce resonance reducing elements into the reception circuit in order to increase the output voltage and introduce resonance increasing elements into the reception circuit in order to reduce the output voltage.

Figure 20:
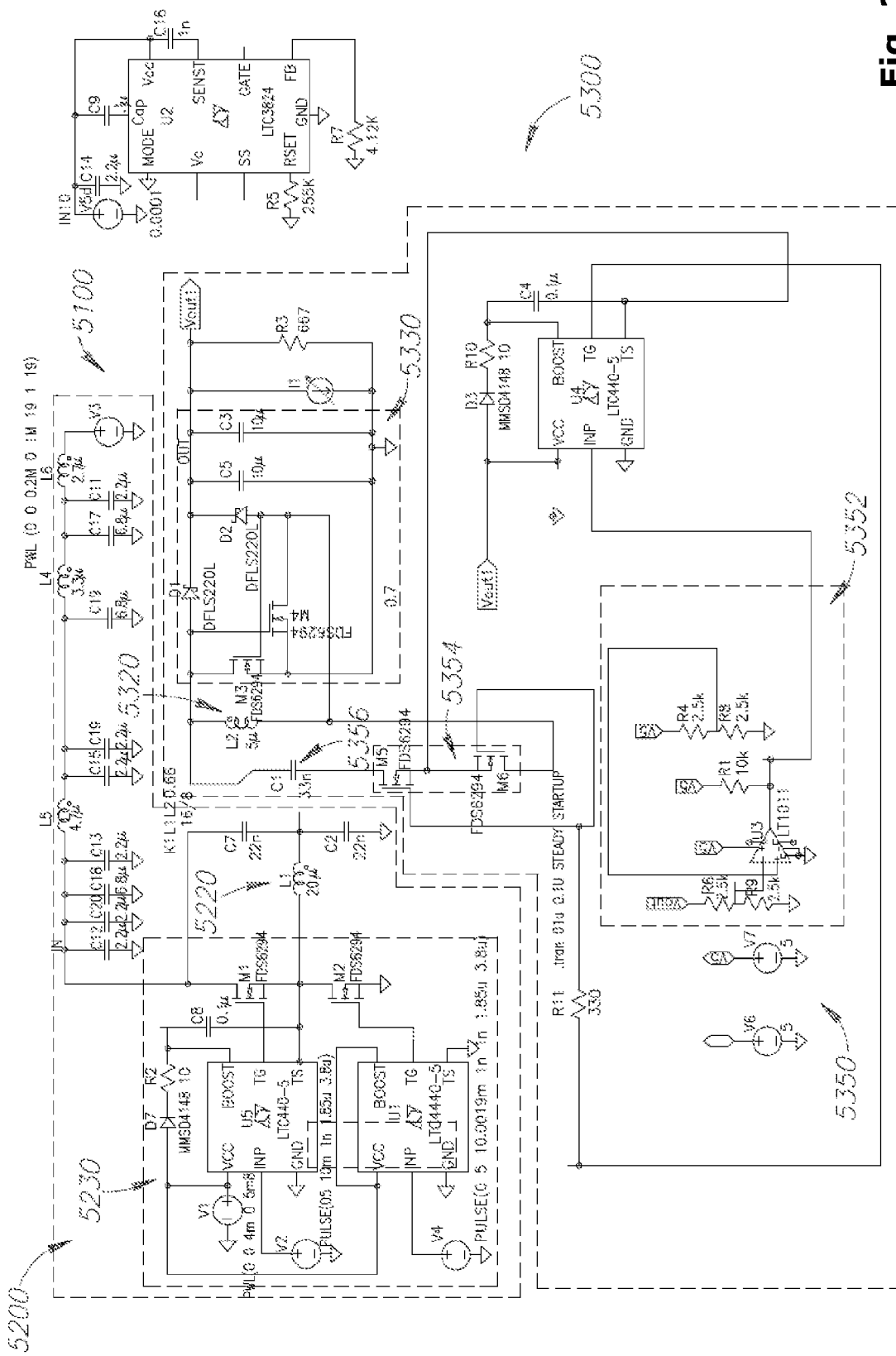
FIG. 20 is a circuit diagram representing the transmitter and receiver circuits of an inductive power transfer system according to another embodiment.

Reference is now made to FIG. 20 showing a possible circuit diagram of an inductive power transfer system 5100 according to a basic embodiment of the present invention. The inductive power transfer system 5100 includes an inductive transmitter 5200 and an inductive receiver 5300. The inductive transmitter 5200 includes a primary inductor 5220 and a driving unit 5230. The inductive receiver 5300 includes a secondary inductor 5320, a rectifier 5330 and a receiver-side regulator 5350.

The receiver side regulator 5350 includes a comparitator 5352, a switching unit 5354 and a capacitor 5356. The comparator 5352 is configured to compare the output signal $V_{out}$ from the rectifier 5330 with a reference value. The switching unit 5354 consists of a pair of power MOSFETs M5, M6 connected source to source so as to serve as an AC switch. The output of the comparator 5352 is converted into a digital signal which is communicated to the gate signal of the power MOSFETs to control the switching unit 5354. The capacitor 5356 is selectively connected in parallel with the secondary inductor 5320 to raise the natural resonant frequency of the system to raise the output voltage as described above.

Figure 21:
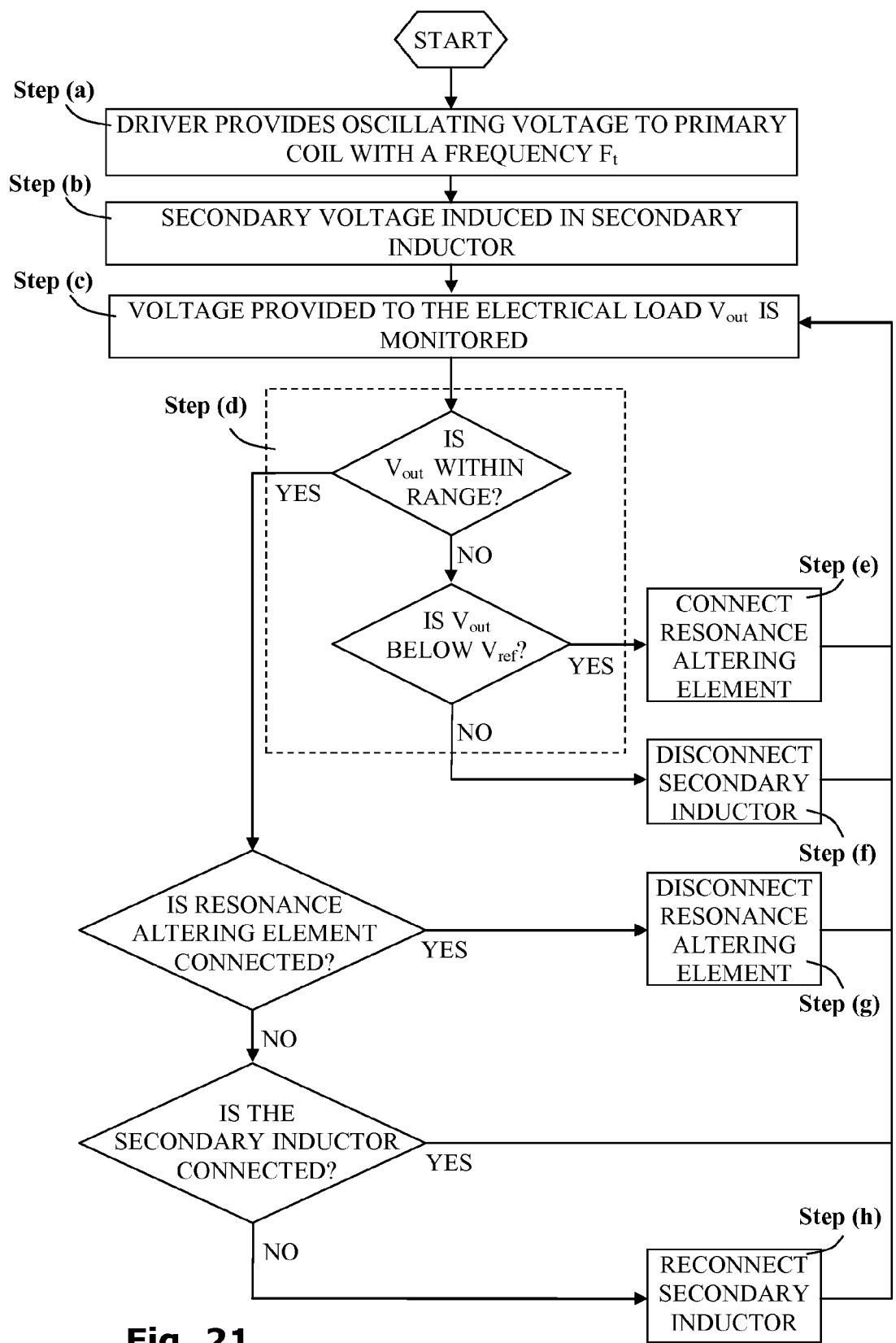
FIG. 21 is a flowchart of a method for regulating inductive power transfer using a receiver based regulator according to still another embodiment.

Power regulation may be controlled according to a method represented by the flowchart shown in FIG. 21. The method includes the steps: step (a)—driving a primary inductor at a transmission frequency significantly different from a first resonant frequency of the inductive power transfer system, step (b)—inducing a secondary voltage across a secondary inductor associated with the reception circuit, step (c)—monitoring the output voltage from the reception circuit, step (d)—comparing the output voltage with a first reference value, step (e)—if the output voltage drops below the first reference value, connecting a resonance-altering component to the reception circuit such that the resonant frequency of the inductive power transfer system shifts closer to the transmission frequency, step (f)—if the output voltage rises above a second reference value, disconnecting the secondary inductor from the reception circuit, step (g)—disconnecting the resonance-altering component from the reception circuit when the output voltage reaches the first reference value and step (h)—reconnecting the secondary inductor from the reception circuit when the output voltage reaches the second reference value.

Figure 22:
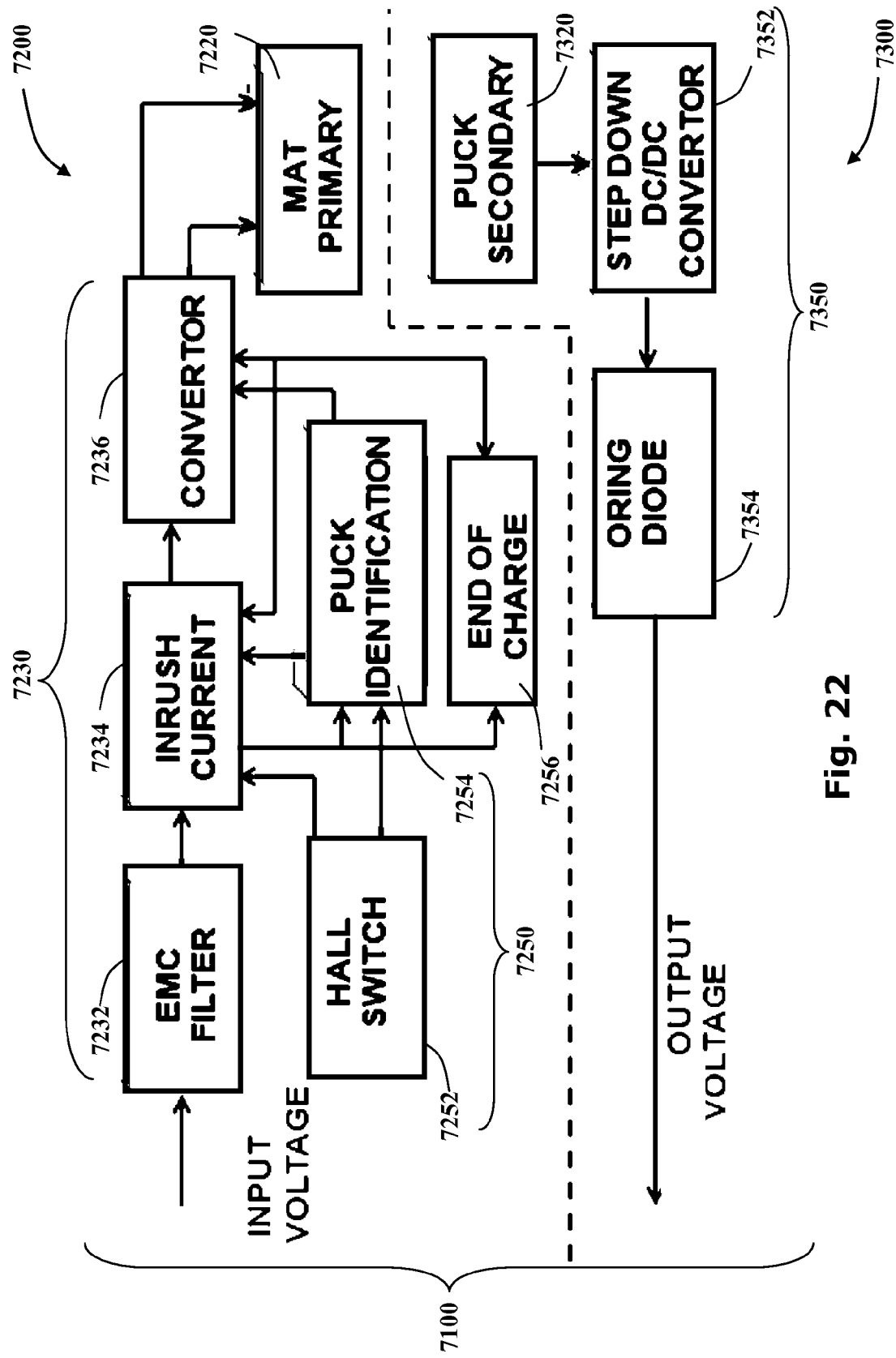
FIG. 22 is a block diagram showing the main electrical components of a constant frequency inductive power transmission system including a receiver-side regulator.

Referring now to the block diagram FIG. 22 the main electrical components of a constant frequency inductive power transmission system 7100 are shown including a receiver-side regulator 7350. The inductive power transmission system 7100 which includes an inductive power transmitter 7200 and an inductive power receiver 7300 is configured to operate at a constant frequency. The operating frequency may be selected to be at the natural frequency of the receiver unit 7300.

The inductive power receiver 7300 includes a secondary inductor 7320, a step down DC/DC converter 7532 and an O-ring diode 7354. The secondary inductor 7320 is connected to a step down DC/DC converter 7352 configured to maintain a constant voltage output which is further stabilized by the O-ring diode 7354.

The inductive power transmitter 7200 includes a primary inductor 7220, a driver unit 7230 and an activation unit 7250. The activation unit 7250 comprises a Hall switch 7252, a puck (receiver) identification unit 7254 and an end of charge controller 7256. The Hall switch 7252 is configured to detect the presence of a magnetic element associated with the receiving unit 7300 and to send a signal to the puck identification unit 7254 which then sends an activation signal to the driver unit 7230. The end of charge controller 7256 is configured to deactivate the driving unit 7230 when no further power is required by the receiving unit. Although separate units are indicated for each of these elements, where appropriate a single microcontroller may be provided having multiple functionality. For example a single microcontroller may provide puck identification and end of charge control functionality as well as a pulse signal to the driver at the operating frequency.

The driver unit 7230 includes an EMC filter 7232, an inrush current unit 7234 and a converter 7236. It is a particular feature of the driver unit that the activation signal from the puck identification unit 7254 may trigger the inrush current unit 7234 to initiate a soft start gradually increasing the voltage to the primary inductor 7220, possibly linearly, from zero until it reaches the input voltage.

Figure 23A:
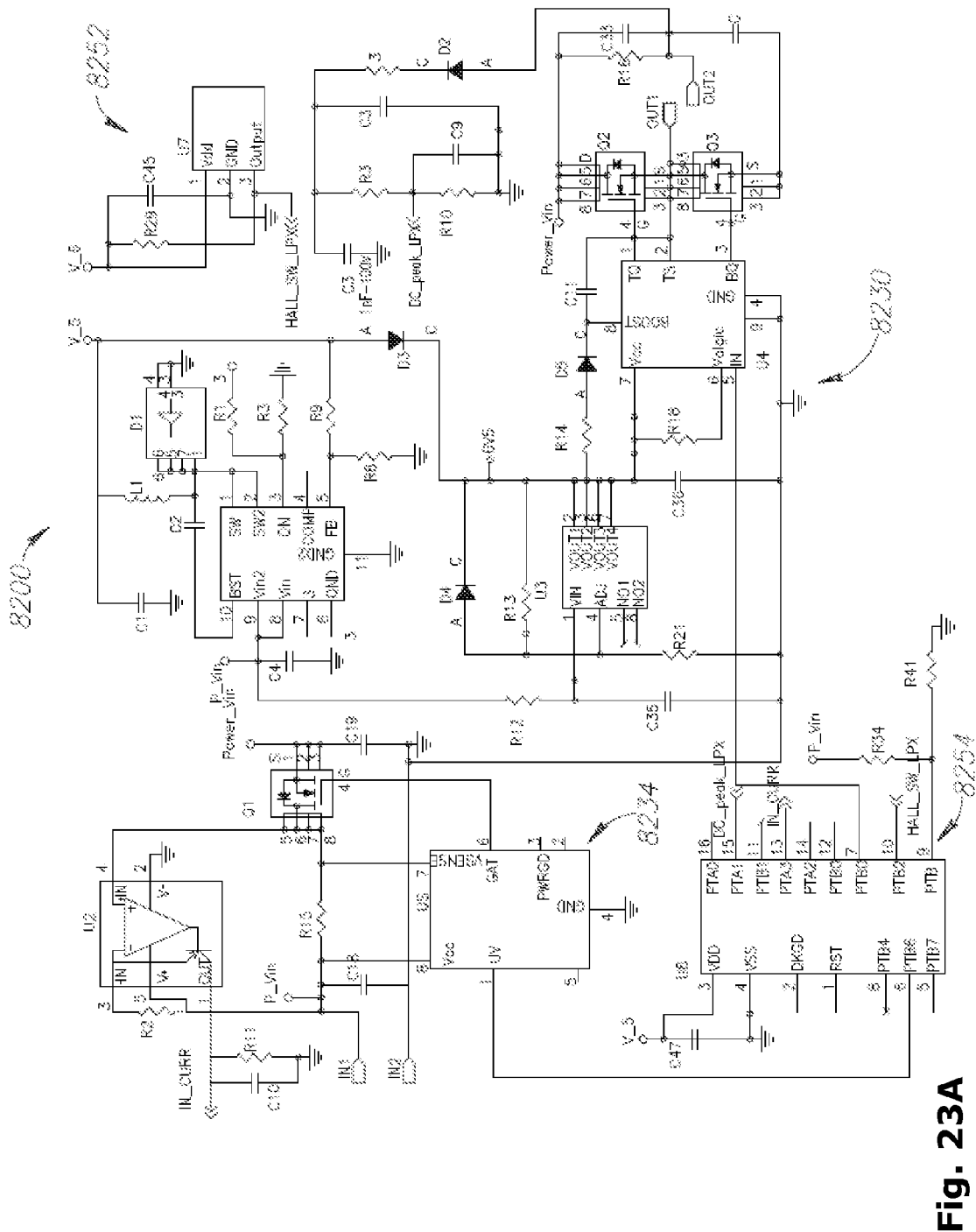
FIGS. 23A and 23B represent a model circuit diagram representing a further example of an inductive power transmission system including a receiver-side regulator.
Figure 23B:
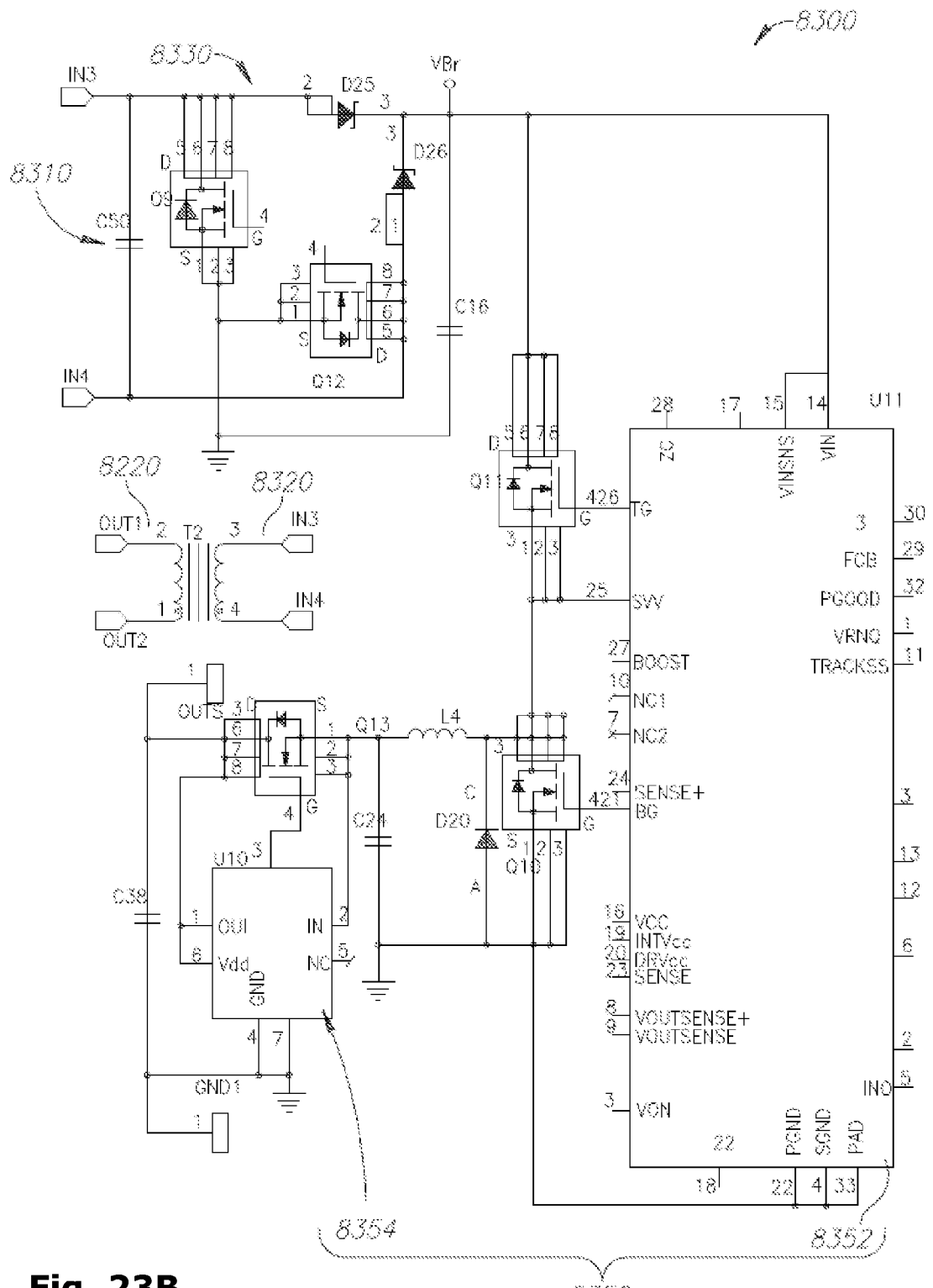

Reference is now made to FIGS. 23A and 23B showing a possible circuit diagram of a further basic inductive power transfer system. The inductive power transfer system 8100 includes an inductive transmitter 8200 and an inductive receiver 8300. The inductive transmitter 8200 includes a primary inductor 8220 an inrush current unit 8234 and a driving unit 8230. The inductive receiver 8300 includes a secondary inductor 8320, a capacitance element 8310, a rectifier 8330 and a receiver-side regulator 8350. The receiver side regulator 8350 includes a step-down DC/DC converter 8532 unit and an O-ring diode unit 8354.

The capacitance element 8310 is connected in parallel to the secondary inductor 8320 and is configured to produce a half-sinewave shape to the primary current flowing through the primary inductor 8220. It is particularly noted that the half-sine wave shape of the primary inductor 8220 has a smooth profile with no sudden switching. Therefore, less electromagnetic interference (EMI) is generated which is typically associated with stepped signal profiles. Consequently, the inductive transfer system 8100 as a whole is more efficient than systems having stepped profiles. Furthermore, it is noted that the number of turns of the windings of the primary inductor 8220 and secondary inductor 8320 may be thereby reduced.

The various embodiments described hereinabove disclose inductive power transmission systems operable to transmit power efficiently over a wide range of intercoil spacings using a variety of performance enhancing elements. The scope of the disclosed subject matter is defined by the appended claims and includes both combinations and sub combinations of the various features described hereinabove as well as variations and modifications thereof, which would occur to persons skilled in the art upon reading the foregoing description.

In the claims, the word "comprise", and variations thereof such as "comprises", "comprising" and the like indicate that the components listed are included, but not generally to the exclusion of other components.

The invention claimed is:

1. An inductive power transfer system comprising at least one of an inductive power transmitter and an inductive power receiver, said inductive power transmitter comprising at least one primary inductor configured to couple inductively with at least one secondary inductor and at least one driver configured to provide an oscillating electric potential at a driving frequency across said primary inductor; and said inductive power receiver comprising at least one secondary inductor connectable to a receiving circuit and an electric load, said secondary inductor configured to couple inductively with said at least one primary inductor such that power is transferred to said electric load;

wherein said inductive power transfer system is selectively operable in a tightly coupled mode, for allowing efficient inductive power transfer over a short range, and a loosely coupled mode for allowing efficient inductive power transfer over longer ranges, and wherein said inductive power transfer system further comprises a mode selector configured to switch said inductive power transfer system between at least said tightly coupled mode and said loosely coupled mode;

said inductive power transfer system further comprising a plurality of features selected from:

an alignment mechanism configured to align said at least one secondary inductor to said at least one primary inductor when said inductive power transfer system is operating in said tightly coupled mode;

a resonance tuner operable to match said driving frequency to a resonant frequency of said reception circuit when said inductive power transfer system is operating in said loosely coupled mode;
an auxiliary coil arrangement comprising a plurality of auxiliary coils operable in at least one of: conductor mode, repeater mode and transmission mode;
a resonance seeking arrangement operable to determine the natural frequencies of the inductive power transfer system; and
wherein:
said driver is configured to drive said primary inductor at a non-resonant frequency when operating in said tightly coupled mode, and
said driver is configured to drive said primary inductor at said resonant frequency of said reception circuit when said inductive power transfer system is operating in said loosely coupled mode.

2. The inductive power transfer system of claim 1 further comprising at least one of:
a proximity sensor for monitoring the distance from said secondary inductor to said primary inductor; and
a position sensor for monitoring the position of said primary inductor.

3. The inductive power transfer system of claim 1 wherein said resonance tuner comprises at least one of a capacitor and an inductor selectively connectable to said receiving circuit.

4. The inductive power transfer system of claim 1 wherein said resonance tuner comprises a feedback mechanism configured to send control signals to said inductive power transmitter such that said inductive power transmitter selects a driving frequency resonant with said receiving circuit.

5. The inductive power transfer system of claim 1 wherein said alignment mechanism comprises at least one actuator configured to move at least one of said secondary inductor and said primary inductor.

6. An inductive power transfer system comprising an inductive power transmitter selectively operable in a tightly coupled mode, for allowing efficient inductive power transfer over a short range, and a loosely coupled mode for allowing efficient inductive power transfer over longer ranges, said transmitter comprising:
a mode selector configured to switch said inductive power transmitter between at least said tightly coupled mode and said loosely coupled mode;
at least one primary inductor configured to couple inductively with a secondary inductor connected to an electric load such that power is transferred to said electric load;
at least one driver configured to provide an oscillating electric potential across said primary inductor;
at least one alignment mechanism configured to align said secondary inductor to said primary inductor when said inductive power transmitter is operating in said tightly coupled mode;
at least one resonance tuner configured to select a driving frequency for said oscillating electrical potential selected to match a resonant frequency of a reception circuit associated with said secondary inductor when said inductive power transmitter is operating in said loosely coupled mode; and
wherein:
said driver is configured to drive said primary inductor at a non-resonant frequency when operating in said tightly coupled mode, and
said driver is configured to drive said primary inductor at said resonant frequency of said reception circuit when said inductive power transfer system is operating in said loosely coupled mode.

7. The inductive power transfer system inductive power transmitter of claim 6 further comprising a resonance seeking arrangement operable to determine the natural frequencies of the inductive power transfer system.

8. The inductive power transfer system of claim 6 further comprising an auxiliary coil arrangement comprising a plurality of auxiliary coils operable in at least one of: conductor mode, repeater mode and transmission mode.

9. The inductive power transfer system of claim 8 wherein said auxiliary coil arrangement comprises:
at least one auxiliary coil;
at least one controller configured to select an operational mode for the auxiliary coil; and
at least one switching unit operable to selectively connect said auxiliary coil to at least one of a conductive mode block, a repeater mode block and a transmission mode block.

* * * * *